US012255919B1

United States Patent
Mushtaq

(10) Patent No.: US 12,255,919 B1
(45) Date of Patent: Mar. 18, 2025

(54) INTEGRATED SECURITY FOR CLOUD APPLICATIONS

(71) Applicant: SlashNext, Inc., Pleasanton, CA (US)

(72) Inventor: Atif Mushtaq, San Ramon, CA (US)

(73) Assignee: SlashNext, Inc., Pleasanton, CA (US)

( * ) Notice: Subject to any disclaimer, the term of this patent is extended or adjusted under 35 U.S.C. 154(b) by 0 days.

(21) Appl. No.: 18/820,347

(22) Filed: Aug. 30, 2024

Related U.S. Application Data

(60) Provisional application No. 63/580,465, filed on Sep. 5, 2023.

(51) Int. Cl.
*H04L 9/40* (2022.01)

(52) U.S. Cl.
CPC .............................. *H04L 63/1483* (2013.01)

(58) Field of Classification Search
None
See application file for complete search history.

(56) References Cited

U.S. PATENT DOCUMENTS

| | | | | |
|---|---|---|---|---|
| 7,831,676 | B1 * | 11/2010 | Nagar | G06Q 10/107 709/224 |
| 8,549,087 | B2 * | 10/2013 | Leonard | H04L 63/1433 713/176 |
| 9,467,435 | B1 * | 10/2016 | Tyler | H04L 51/212 |
| 9,813,412 | B1 * | 11/2017 | Yang | H04L 63/145 |
| 11,895,151 | B1 * | 2/2024 | Castro | H04L 63/12 |
| 12,047,334 | B1 * | 7/2024 | Derza | H04L 51/02 |
| 2006/0068755 | A1 * | 3/2006 | Shraim | H04M 15/47 455/410 |
| 2016/0014151 | A1 * | 1/2016 | Prakash | H04L 47/62 726/22 |
| 2017/0357819 | A1 * | 12/2017 | Sherkin | G06F 21/6218 |
| 2018/0091453 | A1 * | 3/2018 | Jakobsson | H04L 63/1441 |
| 2018/0295153 | A1 * | 10/2018 | Eisen | H04L 63/1433 |
| 2020/0067861 | A1 | 2/2020 | Leddy et al. | |
| 2020/0322360 | A1 * | 10/2020 | Noon | H04L 63/1416 |
| 2021/0021612 | A1 * | 1/2021 | Higbee | H04L 63/1416 |
| 2021/0211462 | A1 * | 7/2021 | Birch | H04L 63/0236 |
| 2022/0036153 | A1 | 2/2022 | O'Malia et al. | |

(Continued)

OTHER PUBLICATIONS

PCT/US2024/044633 International Search Report and Written Opinion dated Nov. 21, 2024.

*Primary Examiner* — Khang Do
(74) *Attorney, Agent, or Firm* — Wilson Sonsini Goodrich & Rosati

(57) ABSTRACT

Provided herein are systems and methods for detecting a phishing attack. The method comprises: processing an original message to determine whether the original message is suspicious or benign, upon determining the original message is suspicious, generating multiple copies of the original message for detecting a phishing attack, where the multiple copies are varied from the original message in least one of tones, formats, and writing styles, and the multiple copies are generated to be similar to a training dataset that is utilized to train a phishing attack detection engine; and processing the multiple copies and the original message by the phishing attack detection engine to determine whether the original message is malicious or benign. One or more copies from the multiple copies that are not identified as malicious are utilized to further train the phishing attack detection engine automatically.

26 Claims, 14 Drawing Sheets

(56) References Cited

U.S. PATENT DOCUMENTS

| | | | |
|---|---|---|---|
| 2023/0291767 A1* | 9/2023 | Pearce | H04L 63/126 |
| 2024/0314164 A1* | 9/2024 | Richardson | H04L 63/1483 |
| 2024/0388551 A1* | 11/2024 | AlFardan | H04L 51/212 |

* cited by examiner

| Original 411 | Augmented 413 | Type 415 |
|---|---|---|
| Subject: Payment Details<br><br>Hi, please see attached.<br><br>Thanks. | Subject: Payment Details for your recent purchase<br><br>I hope this email finds you well. We would like to provide you with the payment details for the recent purchase. Kindly see invoice attached to this email. | Expansion |
| Subject: Confirm Banking Information<br><br>EXTERNAL EMAIL CAUTION: This email originated from outside of company. Do not click links or open attachments unless they are expected.<br><br>Good morning,<br><br>We have requested you to send us the proforma invoice for payment process but it seems there are two (2) bank account details on the invoice, kindly confirm which one the payment is to be sent to.<br>Awaiting your urgent response<br>Kind regards,<br>Jayna<br><br>CONFIDENTIALITY NOTICE: This email message and any accompanying data or files is confidential and may contain privileged information intended only for the named recipient(s). If you are not the intended recipient(s), you are hereby notified that the dissemination, distribution, and or copying of this message is strictly prohibited. If you receive this message in error, or are not the named recipient(s), please notify the sender at the email address above, delete this email from your computer, and destroy any copies in any form immediately. Receipt by anyone other than the named recipient(s) is not a waiver of any attorney-client, work product, or other applicable privilege. | Subject: Verify ACH Details<br><br>Your proforma invoice contains two bank account details; could you please confirm which one we should direct the payment to?. | Contraction |
| Subject: Suggestions<br>Hello,<br><br>I plan on surprising some select members of the staff with gifts as an incentive for their recent hard work and dedication. I have a couple of options in mind but I'd like your opinion on this. What knowledge do you have of gift cards and which do you think will make an excellent choice?<br><br>Thanks.<br>Alex Brown<br>CEO | Subject: Advice<br>Hi,<br>I want to amaze several employees with rewards for their recent hard work. I'm open to suggestions. Which gift certificates do you know and believe are good?<br><br>Sincerely,<br>Alex Brown<br>Chief Executive Officer | Synonyms replacement |

*FIG. 4A*

INTEGRATED SECURITY FOR CLOUD APPLICATIONS

CROSS-REFERENCE TO RELATED APPLICATIONS

This application claims the priority and benefit of U.S. Provisional Application No. 63/580,465 filed on Sep. 5, 2023, the entire content of which is incorporated herein by reference.

BACKGROUND

Traditional phishing attacks frequently aim to obtain login credentials, credit card information, or personal data that can be used for identity theft, unauthorized account access, or financial fraud. In order to do so, they frequently rely on phishing links that direct recipients to fraudulent websites designed to collect login credentials, personal information, or spread malware. They may also use mass campaigns to reach as many potential victims as possible, or use deceptive websites or forms that look like legitimate organizations to trick users into providing sensitive information.

In contrast, business email compromise (BEC) attacks are a type of cybercrime that target companies and people in an effort to fraudulently obtain money or sensitive data. In a BEC attack, the attacker assumes the identity of a trustworthy source, and they are frequently sophisticated and well-researched, making them more difficult to detect. BEC attacks can target organizations of all sizes and industries, and may result in substantial financial losses, reputational harm, and legal ramifications for the targeted organization. Therefore, there is a need for a security system that can analyze messages and detect such attacks to prevent access to financial resources or sensitive information of a user or organization.

SUMMARY

Recognized herein is a need for methods and systems capable of analyzing messages (e.g., emails and texts) to detect an attack, including a business email compromise (BEC) attack. The present disclosure may address the above needs by providing a system that can be integrated into a cloud-based server providing an application to detect such an attack. The system can comprise one or more modules for phishing analysis and detecting of the attack by analyzing one or more aspects of the message. The systems and methods provided herein may utilize a tiered framework to process and analyze a message (e.g., email, text message, etc.) to detect an attack or threat. The tiered framework may comprise a first tier or first layer to perform contextual analysis on a message to determine whether the message is suspicious or benign and a second tier or second layer to confirm a suspect message as a BEC attack. The first layer of analysis or the contextual analysis may employ high-speed natural language processing (NLP) techniques (e.g., high-speed machine learning) to rapidly classify incoming messages. In some cases, the classification in the first layer is to determine whether an incoming message (e.g., email) is suspicious enough to warrant further examination through process-intensive dynamic analysis in a second layer. In some cases, the first layer may further comprise an Optical Character Recognition (OCR) engine to extract text out of embedded images prior to applying Natural Language Processing (NLP).

In the second tier or second layer, dynamic analysis may be conducted on the identified suspicious message. The system herein may employ runtime input data augmentation in the second layer to identify BEC attacks. Such runtime augmentation beneficially allows for the system to detect BEC that differ significantly from the past attacks that are known by the system or that were excluded from the training data to avoid false positives. The second layer may employ a generative model, a discriminative model, or a combination of both to process the runtime augmented messages.

In some embodiments, the second layer of the tiered framework may comprise an augmentation engine to generate copies of messages (referred to as clones) for the identified suspicious message. The clones or the multiple copies of the message may be generated to be similar to the training data of the models to better detect an attack. In some cases, the runtime augmentation may include employing contraction and expansion techniques to rephrase a message (e.g., email), making the clones similar to the training data. The clones along with the original message may then be processed by a classifier to identify a BEC attack.

The capability of generating one or more clones of the message (e.g., email) in real time i.e., runtime augmentation, beneficially allows the system to better extract a topic, intent, emotions and/or style of the message with improved prediction accuracy. This can provide for a rich data set for training and retraining of the system, as well as runtime predictions. This ability of the system to continuously learn and improve over time may improve the long-term effectiveness of the system.

In an aspect, a method for phishing detection for emails is provided. The method comprises: (a) processing an original message to determine whether the original message is suspicious; (b) upon determining the original message is suspicious, generating multiple copies of the original message for detecting a phishing attack, wherein the multiple copies are varied from the original message in least one of lengths, tones, formats, and writing styles such that the multiple copies are generated to be similar to a training dataset that is utilized to train a phishing attack detection engine; and (c) processing the multiple copies and the original message by the phishing attack detection engine to detect an attack.

In a related yet separate aspect, a system is provided for phishing detection for emails. The system comprises: memory for storing a set of software instructions, one or more processors configured to execute the set of software instructions to perform operations comprising: (a) processing an original message to determine whether the original message is suspicious; (b) upon determining the original message is suspicious, generating multiple copies of the original message for detecting a phishing attack, wherein the multiple copies are varied from the original message in least one of lengths, tones, formats, and writing styles such that the multiple copies are generated to be similar to a training dataset that is utilized to train a phishing attack detection engine; and (c) processing the multiple copies and the original message by the phishing attack detection engine to detect an attack.

In some embodiments, operation (a) comprises extracting a set of features from the original message utilizing a fast speed natural language processing technique. In some cases, the set of features comprise at least one of a header feature, a content feature, a sender background feature, and a sender relationship. In some instances, the method further comprises processing the set of features by a classifier to determine whether the original message is suspicious.

In some embodiments, the multiple copies are generated utilizing a large language model. In some embodiments, (c) comprises extracting a set of features from the multiple copies and the original message utilizing a deep learning model. In some cases, the set of features comprise at least an intent and motive feature extracted utilizing the deep learning model.

In some embodiments, the multiple copies and the original message are processed by the phishing attack detection engine to classify the original message and each copy as malicious or benign. In some embodiments, the method further comprises when the original message is classified as malicious at (c), storing one or more copies from the multiple copies that are not classified as malicious as training data. In some cases, the method further comprises training the phishing attack detection engine using the one or more copies from the multiple copies to improve the phishing attack detection engine. In some cases, the method further comprises aggregating a classification for each of the multiple copies and the original message to detect the attack. For example, the attack is detected when a voting count of the classification is above a threshold. In some embodiments, the original message is received from a sender in an image and is extracted from the image utilizing Optical Character Recognition prior to performing (a).

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 4A and FIG. 4B show examples of clones of an email generated using a phishing detection system in accordance with the embodiments of the invention;

DETAILED DESCRIPTION

Figure 1:
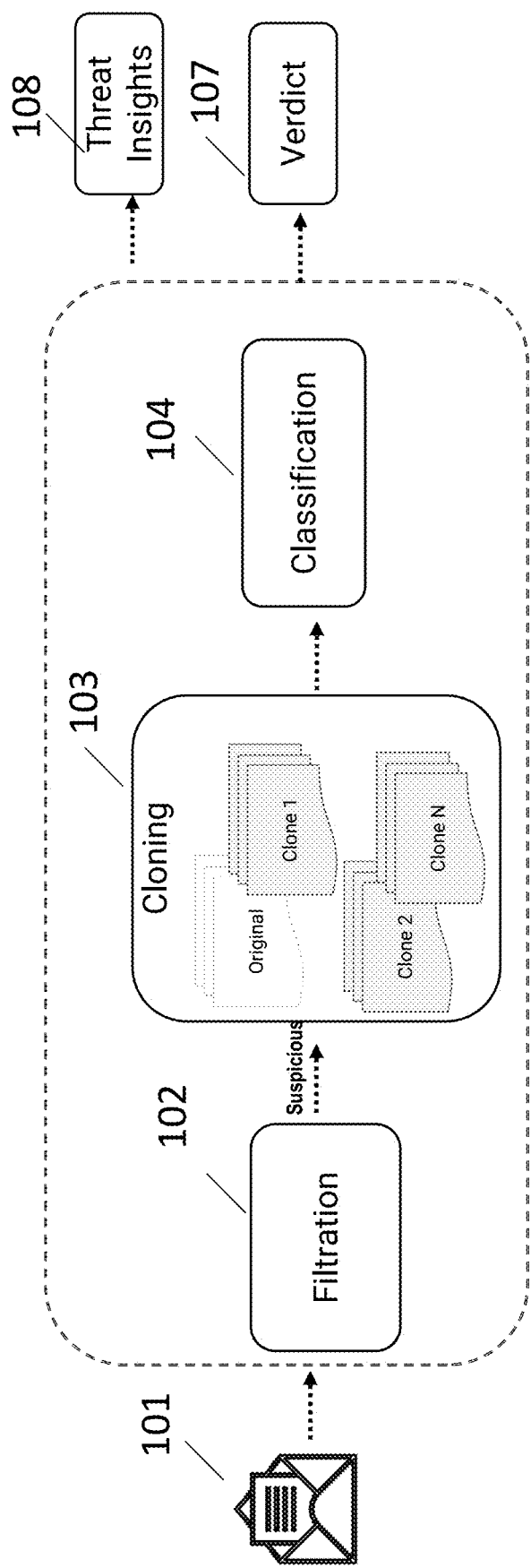
FIG. 1 shows an example of a schematic illustrating run time prediction of a phishing attack in accordance with the embodiments of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Business Email Compromise (BEC) Attacks

The primary goal of business email compromise (BEC) attacks can be to deceive the recipient into taking a specific action. For example, attackers may use emails to request wire transfers, invoice payments, or payroll changes to divert funds. They may also seek access to employee or customer data in order to engage in additional fraudulent activities. An attacker may deceive the recipient into a specific action via emails by impersonating a trusted individual, such as a vendor or client, or a respected internal or external figure, such as the CEO, CFO, or another senior executive. To make the email or message appear legitimate, the attackers may manipulate the email headers and content. This can allow the attacker to gain unauthorized access to financial resources or sensitive information within an organization, while making it difficult to detect the attack.

A BEC attack may generally include one or more of the following: (1) target selection; (2) email spoofing; (3) deception; (4) social engineering; and (5) financial loss or data breach. BEC attacks can be highly targeted. For example, in target selection phase, the attacker may conduct research to learn more about the target company, its important employees, and their communication styles, and tailor their messages to them. They may include specific information about the organization, its employees, ongoing projects, or recent transactions to boost the email's credibility. In some examples, target selection entails searching through public databases, social media profiles, or even email accounts. Further, to make emails seem as though they are coming from a reliable source, the attacker can employ a variety of strategies, including email spoofing and domain spoofing. To send the fraudulent messages, they may create an email address that closely resembles the target's email address or use compromised email accounts. In addition, to trick the recipient, the attacker may carefully craft the email's content. To persuade the target to comply with their requests, they may use a sense of urgency, authority, or familiarity. Requesting wire transfers, paying fraudulent invoices, changing account information, or requesting sensitive information like employee records or login credentials are examples of common strategies. The attacker may generally use social engineering strategies to control the target's feelings, emotion, or behavior. To persuade the recipient to act quickly and forego customary security precautions, they may employ psychological manipulation, emotional appeals, or even coercion. They may further take advantage of internal relationships or external partnerships to increase the likelihood of compliance. Finally, the result of a successful BEC attack may likely be a loss of money or a data breach. Sensitive information may be made public, money might be transferred to the attacker's account, or malicious software may be set up on the victim's computer for future exploitation.

There are various types of BEC threats. For instance, the BEC threat may be a payroll theft. A BEC payroll theft scam can comprise cybercriminals impersonating a legitimate company executive or employee and sending fraudulent emails to the payroll department or the human resources staff. The emails may request a change in the bank account details or the direct deposit information of the sender or another employee. If the payroll staff complies with the request, they unknowingly transfer the funds to the scammer's account.

In some instances, a BEC threat may be a funds scam. A BEC funds scam can comprise a cybercrime that targets businesses and individuals who make payments through wire transfers. It can involve hackers impersonating a trusted person or entity, such as a vendor, a client, a colleague, or a boss, and sending fraudulent emails to trick the recipient into transferring money to a bank account controlled by the criminals. The emails can look authentic and use urgent or persuasive language to convince the victim to act quickly. The scammers may also use social engineering techniques, such as researching the target's personal or professional information, to make the emails more believable.

In some cases, a BEC threat may be a reconnaissance. The purpose of a reconnaissance BEC email can be to start a conversation with the victim and create a sense of urgency to prompt a response. Once the victim replies and the attacker establishes trust, they can proceed to plan and execute a more advanced BEC attack. This can involve fraudulent wire transfers, altering payroll information, or stealing sensitive data.

In some cases, a BEC threat may be an assistance scam. For such an attack, the scammer can pretend to be someone who needs help, such as a colleague, a boss, a vendor, or a lawyer, by asking for money, gift cards, or confidential information. The email may look like it comes from a legitimate source, such that the recipient sends money or data to the wrong account.

In some cases, a BEC threat may be a gift card scam. In such instances, the scammer impersonates a senior executive or a trusted partner and asks the employee to buy gift cards for a fake reason, such as rewarding customers or employees, or paying for an urgent expense. The scammer then asks the employee to send the gift card codes or photos of the cards and disappears with the money. The employee is left with no way to recover the funds or contact the scammer.

In some cases, a BEC threat may be an attorney scam, which can often target companies that deal with foreign suppliers or clients. The scammer may impersonate a lawyer or a law firm and contact the company, claiming to handle a sensitive or urgent matter requiring immediate payment. The scammer then instructs the company to wire money to a bank account controlled by the fraudster, often using forged documents or fake websites to support their claims. The company may not realize they have been scammed until they contact their legitimate business partner or lawyer.

In some cases, a BEC threat may be W-form scam primarily aimed at companies during the tax season. In this scheme, the attackers assume the identity of a high-ranking executive, a human resources representative, or a vendor. Their objective can be to obtain copies of tax-related documents, such as W-2/W-9 forms. The acquired information can be exploited for various malicious purposes, including filing fraudulent tax returns, identity theft, or selling the data.

In some cases, a BEC threat may be invoice fraud, often targeting businesses that work with foreign suppliers or regularly perform wire transfer payments. The scammer may impersonate a legitimate vendor or supplier and send a fake invoice requesting payment to a different bank account than usual. The business may not notice the change and pay the fraudulent invoice.

In some embodiments, a BEC threat is 419 scam (e.g., advance-fee fraud or a Nigerian scam) involving sending an email or a letter to a potential victim, claiming to offer a large sum of money in exchange for a small fee or personal information. The scammer may pretend to be a wealthy person, a government official, a lottery winner, or a business partner who needs help with transferring funds. The scammer may ask the victim to pay an advance fee or provide their bank account details, promising to send the money afterwards. However, once the victim pays the fee or shares their information, the scammer will disappear with the money and never send the promised funds.

In some cases, a BEC may be is a beneficiary scam where a scammer contacts a person claiming to be a representative of a bank, a government agency, or a charity. The scammer may tell the person that they have been named as a beneficiary of a large sum of money or an inheritance from a distant relative or a deceased person. The scammer may then ask the person to pay some fees or taxes in advance to receive the money. The scammer may also ask for personal or financial information to verify the person's identity.

In some cases, a BEC threat may be a purchase scam, where, fraudsters send deceptive emails, posing as a legitimate company or service provider. They falsely claim that you have been charged a substantial amount for renewing your membership. These emails often provide a phone number or email address for you to contact in case you wish to dispute the charge or cancel your membership. However, when victims reach out, the scammers, pretending to be representatives of the service provider, admit that an error occurred and request the victim's financial information, such as credit card details, bank account numbers, or social security numbers, under the guise of completing the cancellation process. Their objective is to deceive individuals and obtain their sensitive personal and financial data.

In some cases, a BEC threat may be romance scam, referring to a type of social engineering scam in which scammers use emotional manipulation to prey on individuals looking for love or companionship online. These scams can involve the creation of fake profiles on dating websites or social media platforms, where scammers build a relationship with their victims over a period of time. The scammer may use stolen photos and personal information to create a convincing persona. They may also use various tactics to establish trust and emotional connection, including flattery, love bombing, and even sending gifts. Once a strong emotional connection has been established, the scammer will start to ask for money, often for fake emergencies or unexpected expenses. They may also ask for access to personal information, such as bank account details or social security numbers. In these cases, victims may be less likely to question the authenticity of the relationship or the motives of the scammer, leading them to overlook warning signs or red flags.

In some cases, a BEC threat may be a threat scam in which the attacker often poses as a legitimate individual or organization, such as a bank, a government agency, or a trusted supplier. They may use email, text messages, or phone calls to contact their targets and create a sense of fear to elicit a quick response. The attacker could send death threats to the victim and claim to only stop once they are paid a certain amount of money.

In some cases, a BEC threat may be a sextortion referring to a type of social engineering scam that involves threatening to expose a victim's personal and sensitive information, including sexual content, to the public or their personal contacts unless they comply with the scammer's demands. The scammer may claim to have obtained compromising videos or images of the victim through malware or hacking, or even by using a webcam to record the victim without their knowledge. The scammer may then demand a sum of money (e.g., in cryptocurrency) in exchange for not releasing the compromising material to the public or the victim's personal contacts, such as family members, friends, or colleagues. In some cases, the scammer may also claim to have a connection to law enforcement and threaten to file criminal charges against the victim.

In some cases, a BEC threat may be an investment scam in which individuals or groups pose as investors or global firms with the intention of deceiving others and obtaining money or personal information. The scammers may often create a façade of credibility and promise high returns on investments to attract victims. They may use various tactics, such as offering exclusive investment opportunities, presenting false success stories, or claiming to have insider information. Once victims are enticed, the scammers may request an upfront down payment or request sensitive personal and financial information, such as bank account details or social security numbers, under the guise of conducting due diligence or processing investments.

In some cases, a BEC threat may be a loan scam based on social engineering that can use psychological manipulation to trick individuals or businesses into giving away money or personal information. In a loan scam, the scammer may present themselves as a legitimate lender or loan broker, promising easy access to loans with low interest rates or high approval rates. They may typically use social engineering tactics such as urgency, fear, or trust to convince their victims to hand over sensitive information or send money. In some examples, the loan scam is an advance fee loan scam requiring an upfront fee before the loan is approved. In some examples, the loan scam is a phantom debt scam where the scammer claims that the victim owes a debt that must be repaid immediately, often using aggressive or threatening language to scare the victim. The scammer may claim to be a law enforcement officer or a representative of a legitimate debt collection agency. In some examples, the loan scam is an identity theft loan scam in which the scammer steals the victim's identity and uses it to apply for loans or credit cards in the victim's name.

In some cases, a BEC threat may be a donation scam that preys on people's generosity and desire to help others. In a donation scam, the scammer may pose as a legitimate charity or non-profit organization and solicits donations from unsuspecting individuals or businesses. The scam typically begins with a message that appears to be from a well-known charity or non-profit organization. The message may use emotional language and imagery, urging them to make a donation to a worthy cause. The scammer may provide a link to a fake website that looks similar to the legitimate charity's site, complete with logos, images, and donation buttons. The fake site may even have a convincing domain name similar to the real one. However, the donations made on the fake site goes to the scammers, rather than to the intended charity. Alternatively, the scammer may ask the recipient to wire money or send a check directly to a bank account or address provided in the email. In these cases, the scammer may ask for personal information, such as bank account details, in order to "process the donation." In some cases, the scammer may even pose as a victim of a natural disaster or medical emergency, claiming to be in urgent need of funds.

In some cases, a BEC threat may be a job scam, which may come in a variety of forms, and typically involve fraudsters posing as legitimate employers to trick unsuspecting job seekers into providing personal information or paying money for a job that does not exist. One common type of job scam is the "work from home" scam in which the fraudster will post a job listing online that promises a high-paying job that can be done from the comfort of one's home. The job may involve simple tasks such as data entry or envelope stuffing, and the job seeker may be required to pay a fee to access the job or to purchase training materials. Another common type of job scam is the "secret shopper" scam in which the fraudster will pose as a company looking for secret shoppers to evaluate their stores or services. The job seeker may be asked to provide personal information, such as their name, address, and social security number, and will be asked to pay a fee to access the job. A third type of job scam is the "advance fee" scam in which the fraudster will pose as a recruiter or employer and will offer the job seeker a high-paying job. However, the job seeker will be required to pay a fee upfront to cover the cost of training, background checks, or other expenses.

In some cases, a BEC threat may be an RFQ scam that may aim to exploit individuals responsible for procurement or purchasing functions in organizations by tricking them into believing they have a genuine interest in their products or services and require a quote. These attacks can employ deceptive RFQ conversation starters that result in various types of fraud. In some examples the RFQ scam is shipment fraud, where the shipment of products to the attacker's address is requested while promising deferred payment. This can lead to unauthorized receipt of goods without any intention of making payment. In some examples the RFQ scam is a customer information asking for sensitive customer information under the guise of conducting reference checks. This information can then be misused for identity theft or other fraudulent activities. In some examples the RFQ scam is a vendor's supplier information request exploiting the trust between vendors and suppliers by requesting sensitive supplier information. This information can be used to impersonate suppliers or compromise their accounts for fraudulent purposes.

In some cases, a BEC threat may be QR Phishing (Quishing), where phishing emails embed malicious QR codes inside the email body or attachments. If scanned, malicious QR codes may lead users to malicious content, including sites designed for stealing credentials, those laden with malware, deceptive sites promising free gifts, and pages that falsely intimidate users for baseless reasons. Often, these emails imitate genuine communications from credible sources such as banks, social media platforms, or even colleagues and employers, aiming to convince recipients that the request is legitimate and requires immediate attention.

In some cases, a BEC threat may contain a phishing link. Emails with phishing links direct users to malicious content, including sites designed for stealing credentials, those laden with malware, deceptive sites promising free gifts, and pages that falsely intimidate users for baseless reasons. Often, these emails imitate genuine communications from credible sources such as banks, social media platforms, or even colleagues and employers, aiming to convince recipients that the request is legitimate and requires immediate attention.

In some cases, a BEC threat may contain malicious attachments. Phishing attachments often carry various forms of malicious content, including malware, phishing links, HTML pages designed for phishing, and messages crafted through social engineering. These attachments typically disguise themselves as harmless files, such as documents or ZIP files. The accompanying email usually features a social engineering message designed to entice users into downloading and opening these seemingly harmless attachments.

Integrated Security Systems and Use Thereof

As described above, BEC attacks can be sophisticated, dynamically changing and hard to detect. Sophisticated cyber threats often involve subtle nuances and variations that can evade traditional detection methods. Provided herein are systems and methods for detecting phishing attacks, including the BEC attacks provided herein. The system herein may have improved performance in understanding diverse attack patterns with the adaptability of real-time augmentation. The systems described herein may be capable of preventing zero hour message threats, which may comprise one or more of natural language-based threats, link-based threats, attachment-based threats, or a combination thereof. In some cases, the natural language-based threat may include a business email compromise (BEC), an account takeover attack (ATO) and supply chain, business text compromise, business message compromise, or insider threats. In some examples, the phishing attack is a BEC attack. In some cases, the link-based threat comprises credential harvesting, spear-phishing, scams or frauds, or smishing. In some cases, the attachment-based threat is a malicious attachment, ransomware or malware, or exploits.

In some cases, the system may have the ability to train classification models using auto-generated training data and the capability of runtime input data augmentation (e.g., email augmentation in real-time) using advanced Generative AI techniques. This synergy grants the system unparalleled proficiency in detecting highly sophisticated attacks with exceptional precision and recall rates.

The system and methods herein may perform message or email augmentation in real-time. Runtime augmentation may refer to the input data augmentation conducted at the inference stage. The runtime email augmentation capability beneficially improves the classification accuracy. Unless conventional methods which augment training data for training a model, the system may perform data augmentation during inference stage. For example, the system may augment the input emails intelligently, adding variations and contextually relevant elements to the data for inference, further enhancing the system's ability to discern complex attacks accurately.

While traditional systems are typically static and unchanging once deployed, the system dynamically enhances its training data during runtime using Generative AI. As emails flow into the system, the system can augment and enrich the training data on-the-fly, constantly adapting and fine-tuning its classification and training data generation model (LLM) based on the most recent and relevant examples. This dynamic approach ensures that the system stays up-to-date with emerging attack techniques and evolving trends, boosting its accuracy and reducing the likelihood of false positives and false negatives. The system's use of auto-generated training data through Generative AI is an improvement over the traditional classification systems which often relies on manually labeled data for training. By employing Generative AI to generate training data using run-time samples, the system can simulate a wide range of attack scenarios, creating synthetic and realistic samples that closely mimic genuine attack instances. This abundance of diverse training data equips the classification engine with a deeper understanding of potential threats, enabling it to recognize complex attack patterns that might go undetected by conventional systems.

The system may employ Generative AI techniques for both training data generation and real-time email augmentation. The system may create intricate and authentic attack simulations, ensuring that the training data is of high quality and mirrors real-world threats utilizing customized generative AI models. The system may also augment emails intelligently, adding variations and contextually relevant elements to the data for inference, further enhancing the system's ability to discern complex attacks accurately.

By combining the advantages of auto-generated training data and real-time email augmentation, the system has improved capability of identifying complex attacks. Sophisticated cyber threats often involve subtle nuances and variations that can evade traditional detection methods. However, the system's proficiency in understanding diverse attack patterns, coupled with its adaptability through real-time augmentation, equips it with a comprehensive view of potential risks. The prediction performance of the system (e.g., precision and recall rates) is improved by the self-learning feature and the runtime augmentation feature, ensuring that both known and novel attack vectors are swiftly and accurately identified.

The systems and methods provided herein may utilize a tiered framework to process and analyze a message (e.g., email, text message, etc.) to detect an attack or threat. The tiered framework may comprise a first tier or first layer to perform contextual analysis on a message to determine whether the message is suspicious or benign and a second tier or second layer to confirm a suspect message as a BEC attack. In some embodiments, the verdict of the first layer may indicate whether the message is benign or non-benign (i.e., suspicious), where the non-benign (i.e., suspicious) may be further investigated by the second layer to confirm whether it is malicious or not malicious.

In some embodiments, the first layer of analysis or the contextual analysis may employ high-speed natural language processing (NLP) techniques (e.g., high-speed machine learning) to rapidly classify incoming messages. In some cases, the classification in the first layer is to determine whether an incoming message (e.g., email) is suspicious enough to warrant further examination through process-intensive dynamic analysis in the second layer. In some cases, the first layer may further comprise an Optical Character Recognition (OCR) engine to extract text out of embedded images prior to applying Natural Language Processing (NLP). Depending on the format of the original message (e.g., image, video, PDF, etc.), the first layer may employ suitable techniques such as Optical Character Recognition (OCR) engine to extract the text message prior to applying Natural Language Processing (NLP).

In the second tier or second layer, dynamic analysis may be conducted on the identified suspicious message. The system herein may employ runtime augmentation in the second layer to identify BEC attacks. Such runtime augmentation beneficially allows for the system to detect BEC that differ significantly from the past attacks that are known by the system or that were excluded from the training data to avoid false positives. The second layer may employ a generative model, a discriminative model, or a combination of both to process the runtime augmented messages. In some embodiments, the second layer of the tiered framework may comprise an augmentation engine configured to generate copies of messages (referred to as clones) for the identified suspicious message. The clones or the multiple copies of the message may be generated to be similar to the training data of the models to better detect an attack. In some cases, the runtime augmentation may include employing contraction and expansion techniques to rephrase a message (e.g., email), making the clones similar to the training data. The clones along with the original message may then be processed by a classifier to identify a BEC attack. Details about the tiered-framework and the various components of the framework are described later herein.

The clones or augmented emails may be generated at the inference stage (i.e., after a model is trained and is deployed for making prediction) to be "similar" to the training dataset in terms of factors including, but not limited to, emotions, intents, styles, tones, information, length, or any combination thereof. The term "similar" as utilized herein may refer to rephrasing the original message by using synonyms, modifying vocabulary, varying writing styles, and the like such that the clones of the original message may have a length, a tone, or a style substantially the same as the training data. Such clones may be generated by a generative AI model as described later herein.

The security system described herein may be built into a cloud-based server providing an application, such that the system can alert a user to a malicious message, or filter or block the malicious message. The security system may further provide explainable attack insights to a user, for example, through visual illustrations explaining the reasoning why a message (e.g., an email) may have been classified as malicious. The insights may be generated by a threat insights generator such as the threat insights generator 715 in FIG. 7.

Figure 7:
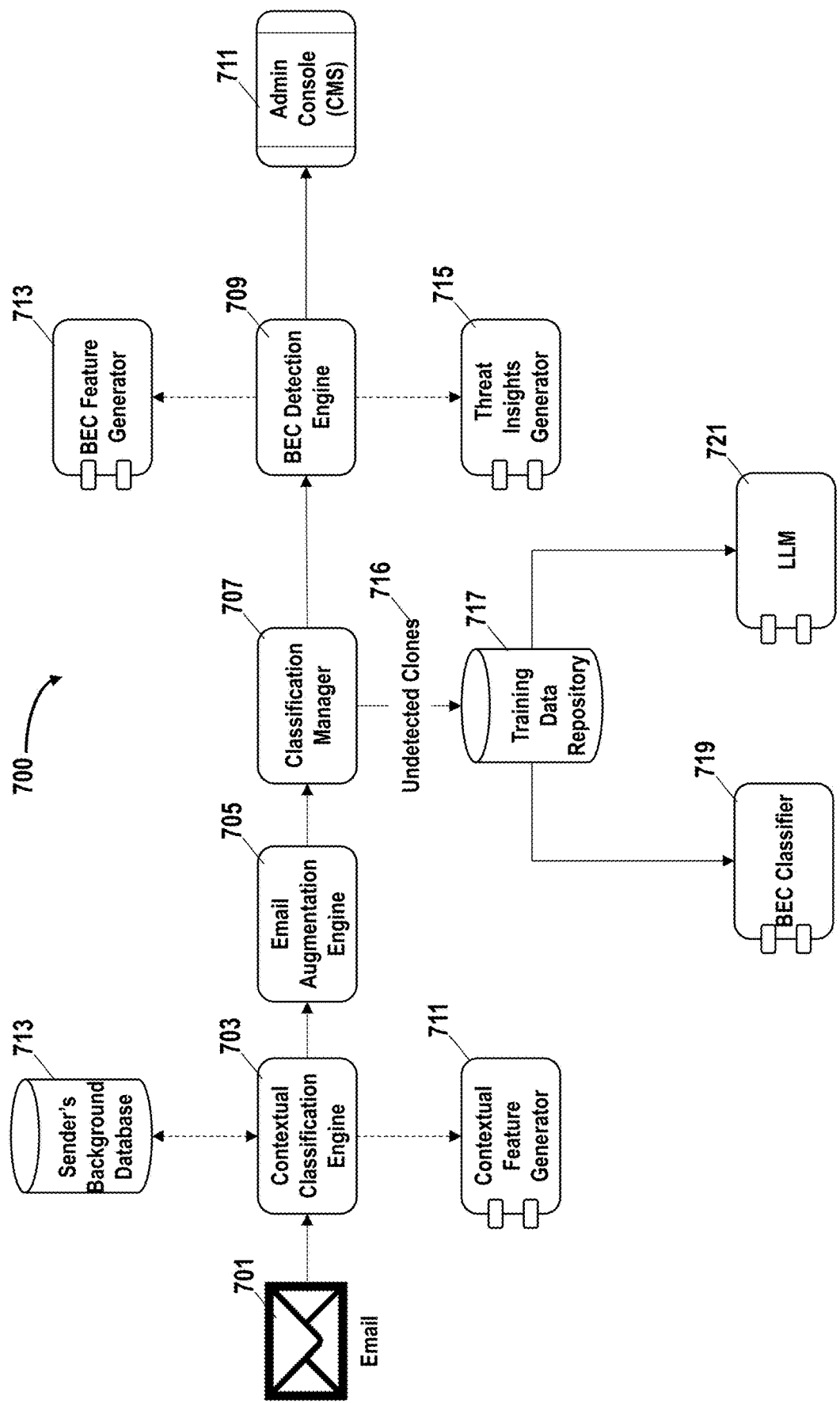
FIG. 7 shows an exemplary framework of a system for detecting a BEC attack.

FIG. 7 shows an exemplary framework 700 of a system for detecting a BEC attack. The framework 700 may be a tiered-framework comprising at least a first layer to conduct contextual analysis on an input message 701. The input to the framework may comprise a text message, an email, a social media message or any message that may comprise text data, image data, audio data, video data or any combination of the above. The input message 701 may also be referred to as the original message. In some cases, the input message may be in the text form. In some cases, the input message may be in any other form such as image or video and text message may be extracted from the original form. For example, an Optical Character Recognition (OCR) engine may be applied to an image of an entire email or message to extract text out of the embedded images prior to applying Natural Language Processing (NLP).

In some cases, the input message 701 may be processed by a contextual classification engine 703. The contextual classification engine may be configured to perform the first layer of analysis or the contextual analysis in the tiered framework. In some cases, the contextual classification engine in the first layer is configured to determine whether an incoming message (e.g., email) is suspicious enough to warrant further examination through process-intensive dynamic analysis in the second layer.

In some embodiments, the contextual classification engine may employ high-speed natural language processing (NLP) techniques (e.g., high-speed machine learning) to rapidly classify incoming original messages. Instead of utilizing deep learning methods to process the original message, the NLP techniques employed by the contextual classification engine may include models or methods for context-level decisions that are capable of generating immediate responses. The NLP models or methods employed by the contextual classification engine may include context-independent algorithms without machine learning (e.g., Bag-of-words, TF-IDF analysis, etc.), context-independent algorithms with machine learning (e.g., context-independent word embeddings, Word2Vec, FastTest, GloVe, etc.) or a combination of any of the above. For example, the contextual analysis engine may employ Word2vec which is a shallow, two-layer neural networks that are trained to reconstruct linguistic contexts of words. The Word2vec may utilize model architectures: continuous bag-of-words (CBOW) to predict the current word from a window of surrounding context words or continuous skip-gram architecture which uses the current word to predict the surrounding window of context words. Utilizing fast-speed machine learning models or fast-speed NLP algorithms for contextual analysis instead of deep learning models can beneficially avoid the low performance speed of deep learning. In some cases, the processing time or computational time for determining whether a message is benign (not suspicious) or suspicious utilizing the fast-speed machine learning model is shorter than the processing time or computational time for making the determination whether the input message is benign or malicious utilizing the deep learning model.

The output of the contextual classification engine may be whether the message is suspicious or benign. For example, the output of the contextual classification engine may be a binary verdict whether the message is benign or not benign (i.e., suspicious). The suspicious message identified by the first layer may be further investigated by the dynamic analysis in the second layer. In some cases, when the contextual classification engine identifies an original email or original message as suspicious, the suspicious email may be forwarded to a second layer for dynamic analysis. In some cases, when the contextual classification engine identifies an original email or original message as benign, the system may stop the further analysis on the email and may declare the email as benign.

In some embodiments, the contextual analysis of the first layer may employ a high-speed machine learning classification process that processes a diverse set of features to categorize incoming messages. In some embodiments, the first layer may comprise a contextual feature generator 711 configured to process the incoming original message or email 701 to generate a diverse set of features, and the extracted set of features may then be fed to the contextual classification engine 703 as input. The system herein may generate or extract a unique set of features from the original message or original email to increase the processing efficiency while maintaining accuracy of the categorization.

In some embodiments, the diverse set of features generated or extracted by the contextual feature generator 711 may comprise header features, content features and/or sender background features. In some cases, when the input message is an Email, Header Features may be extracted from the SMTP header analysis including SPF Authentication, SPF Alignment, DKIM Authentication, DKIM Alignment, DMARC and the like.

Figure 3:
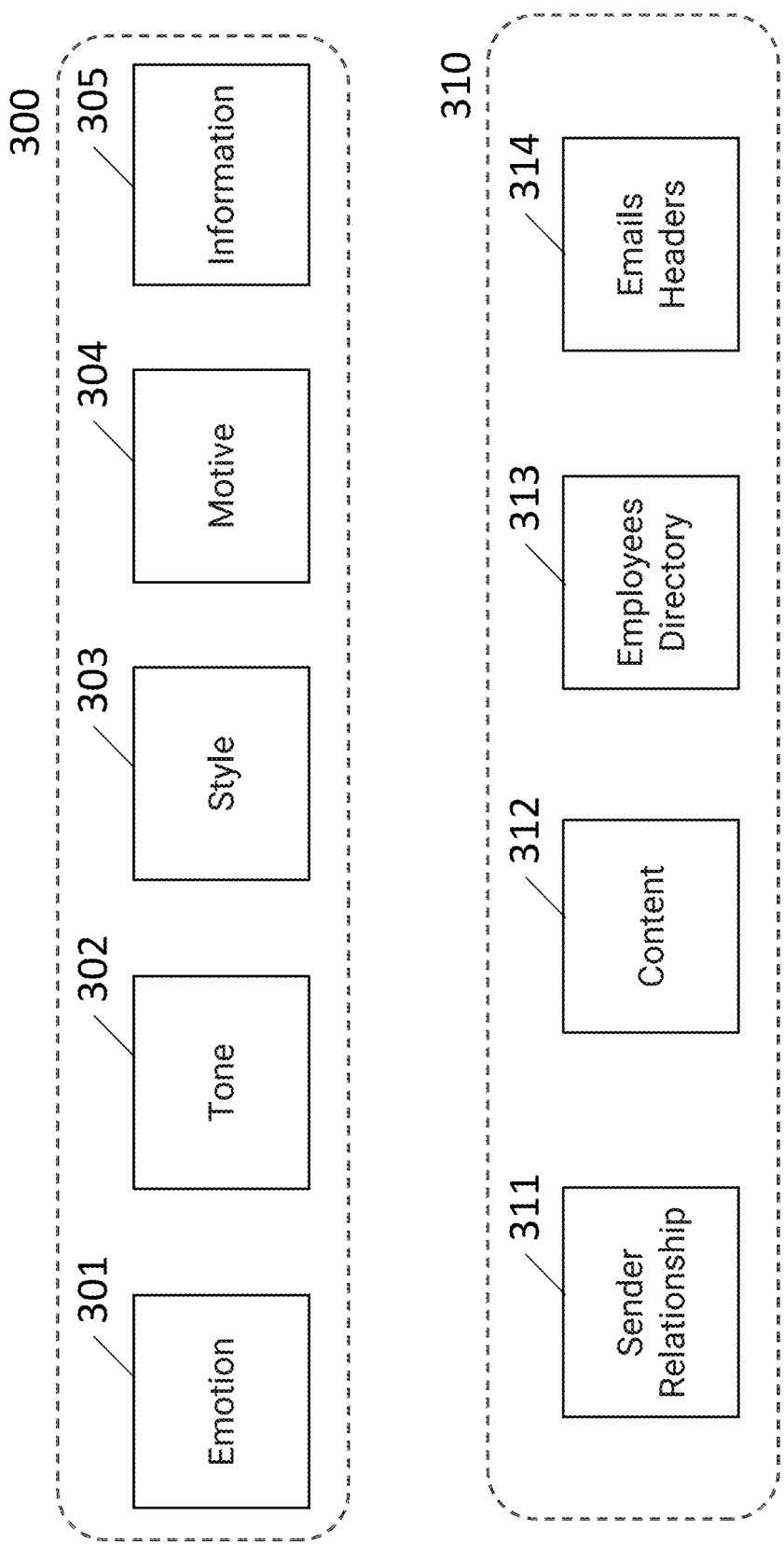
FIG. 3 shows examples of diverse set of features utilized in a phishing detection system in accordance with the embodiments of the invention.

FIG. 3 shows examples of diverse input features from an Email utilized for generating contextual features 310 or BEC features 300. As described later herein, contextual features 310 may be extracted in the first stage of the framework utilizing fast-speed machine learning models or fast-speed NLP algorithms. The contextual features may comprise, for example, header features 314, content features 312 and/or sender background features or sender relationship 311, employees directory 313 (if available). The contextual features may comprise other features extracted utilizing sophisticated models such as writing style, email tone, and emotion. The BEC features 300 as described later herein may be processed in the second layer which comprises deep learning extracted features (e.g., motive/intent 304) in addition to the contextual features (e.g., writing style 303, email tone 302, tone 302). For example, the BEC features may comprise a topic, intent, tone 302, emotions 301 and/or style 303, motive 304, information 305 of the message. The emotion, tone, or style can generally comprise, by way of non-limiting example, one or more of: authority, urgency, frustration, order, anxiety, sad, fear, worried, anger, confident, encouraging, friendly, determined, curious, financial, business, aggressive, assertive, formal, informal, creative, optimistic, pessimistic, surprised, cooperative, or any combination thereof. The intent/motive may comprise one or more categories, text of portions of the message, or both. The text may be text of portions of the message in the one or more categories. As an example, the intent/motive can comprise invoice, finance, scam type (e.g., gift scam, or any other scam type provided herein), or any combination thereof. The information 305 can comprise information in the message, such as financial information (e.g., banking details, amount, payment method, etc.). The diverse input features 310 may comprise header features 314, content features 312 and/or sender background/relationship features 311, and/or employees directory 313. The employee directory 313 may be used to maintain the original name and emails of the employees. Such information is important to detect if there is an impersonation attempt such as when someone is using an employee name with the fake email.

In some instances, the one or more contextual features 310 are extracted by analyzing the sender relationship 311, the content 312, employees directory 313, or the emails headers 314. The employee directory 313 may be used to maintain the original name and emails of the employees. In some examples the employee directory 313 comprises a determination of who they are impersonating, the real email of the user they are impersonating, as well as frequency of communication with the recipient. In some examples, the header analysis 314 comprises one or more of sender policy framework (SPF) authentication, SPF alignment, domainkeys identified mail (DKIM) authentication, DKIM alignment, or domain-based message authentication, reporting, and conformance (DMARC) status.

In some cases, the content features 312 may be generated based at least in part on the email message body. For instance, message body of an email may be processed to extract essential clues from the written communication. The content features may be related to the sender's intent, the message's tone, and the emotions conveyed through the email. In some cases, the content features may be related to the composition of the email such as formatting and style. Such features may be useful to differentiate between manually crafted emails and those generated by machines. In some examples, the content 312 includes analyzing the text of the message, such as tone or style, to determine the intent. In some examples the intent comprises the type of scam, including but not limited to those described herein.

In some cases, the sender background features or sender relationship 311 may be related to historical interactions between the sender and the recipient, and/or interactions between the sender and the recipient's organization. The sender background features may be extracted to ascertain whether the sender has previously engaged in communication with the recipient and/or the recipient's organization. The sender background features may also be analyzed to understand the nature of the past interactions and how the sender typically constructs emails based on that historical data. The fundamental assumption underlying the sender background features analysis is that malicious senders often have limited prior communication history with the recipient and the recipient's organization. An absence of such historical interactions could raise suspicion. As shown in the example, the sender background features may be extracted from data stored in the sender's background database 713. In some cases, processed data such as extracted sender background features may be stored into the sender's background database 713.

In some examples, a sender relationship 311 comprises information such as frequency of communication of the recipient with the sender, their last correspondence, or, in cases where the sender is malicious, the relation between the recipient and the user the attacker is impersonating. The relationship information 311 can be maintained in a Sender background database (e.g., 713 in FIG. 7) employing nodes, edges, and contacts to construct a graph of variable and users. Further, the sender's relationship 311 may comprise information beyond the sender-recipient relation, for example, to an organization level.

In some cases, a known contact's account may be compromised by attackers and the attacker may send malicious emails on the behalf of the comprised account. In such cases, a change in writing style, tone and an unusual intent of the email may serve as indicators pointing to the sender being a compromised user. The combination of the diverse contextual features and the deep learning extracted features (e.g., writing style, tone and intent) beneficially improve the system capabilities in identifying BEC attacks conducted through compromised accounts.

Figure 8:
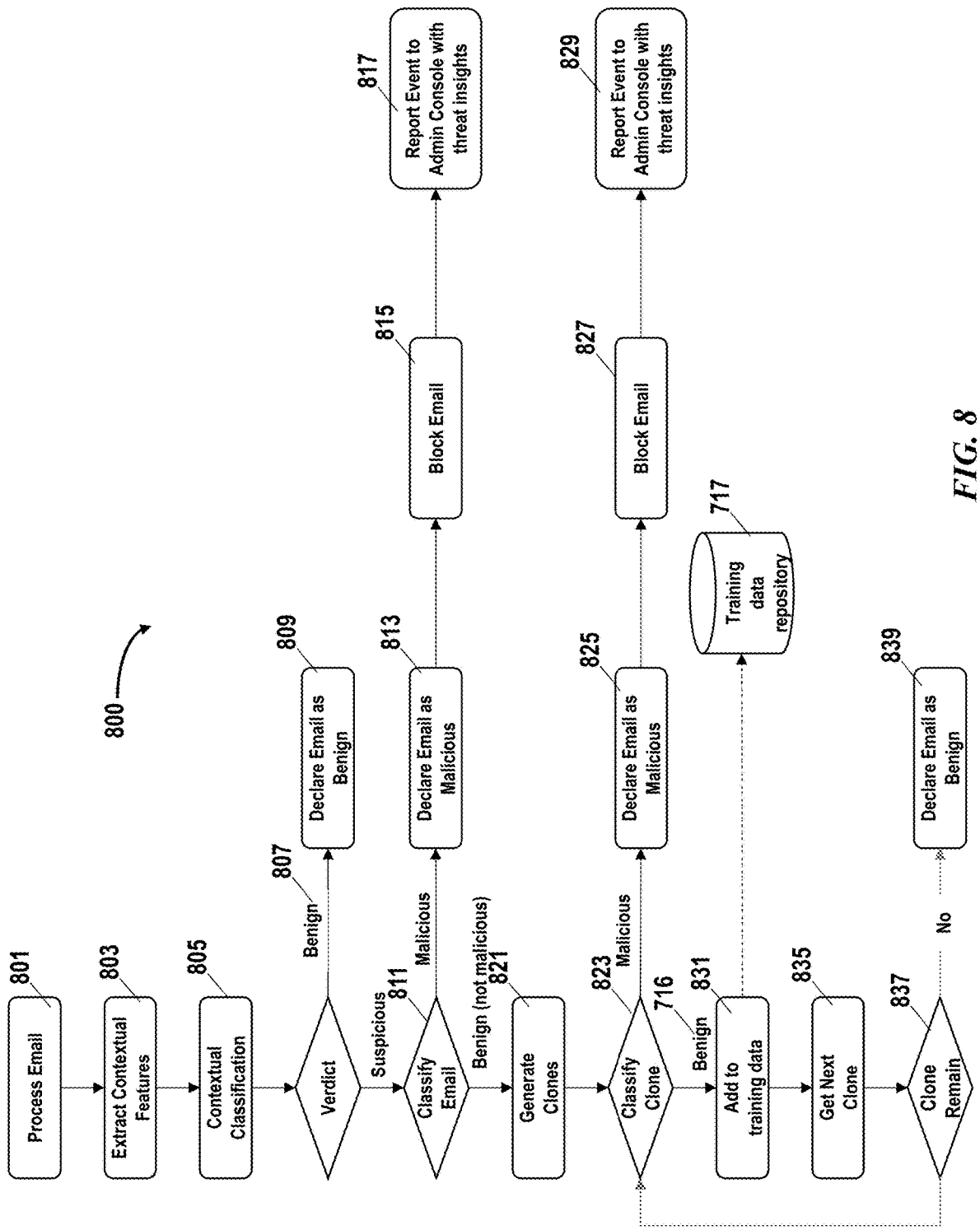
FIG. 8 shows an exemplary method for detecting a BEC attack.

Referring back to FIG. 7, the contextual classification engine 703 may take the set of contextual features as input and produce a verdict. In some instances, the verdict comprises a static output or a dynamic output. In some instances, the verdict comprises a likelihood associated with the verdict. Alternatively, the verdict is binary. FIG. 8 shows an exemplary method 800 for detecting a BEC attack. The method may be implemented by the system or the various components in FIG. 7. For example, an input original message or email 801 may be processed to generate contextual features 803. Once the contextual classification analysis 805 generates a verdict indicating the original message or email is classified as benign 807, the process may be completed and the original message or email may be declared as begin 809. If the verdict indicates the original message or email is classified as suspicious 811, The suspicious email may be further processed by a second tier or second layer of the framework where dynamic analysis may be conducted on the identified suspicious message. The system herein may employ runtime augmentation in the second layer to identify BEC attacks. Such runtime augmentation beneficially allows for the system to detect BEC that differ significantly from the past attacks that are known by the system or that were excluded from the training data to avoid false positives.

Referring back to FIG. 7, the second layer of the tiered framework may comprise an augmentation engine 705 configured to generate copies of messages (referred to as clones) for the identified suspicious message. The clones or the multiple copies of the message may be generated to be similar to training data of the models to better detect an attack. In some cases, the runtime augmentation may include employing contraction and expansion techniques to rephrase a message (e.g., email), making the clones similar to the training data. The clones along with the original message may then be processed to identify a BEC attack.

The message of Email clones may be created to be similar to the training dataset that are utilized to train a classification engine (e.g., classification manager 707). In some cases, the clones may be similar to the training dataset in terms of length of the email. In the instances when the input emails are very short or containing excessively unrelated words, compared to the training data (e.g., synthetic emails generated by a customized generative model as described later herein) which may become overly specific or generic, false positives and false negatives may occur. To mitigate the occurrence of errors, conventional methods may eliminate problematic clones during the training phase, but can introduce the possibility of false negatives. Such issues can be mitigated by the runtime email augmentation which beneficially covers corner cases without increasing false negatives. The augmentation engine may be capable of augmenting the original message or original Email at runtime to be similar to the training dataset using a variety of augmentation techniques.

Unlike augmentation techniques for creating a variety of training data to cover different variations for training model, the runtime augmentation provided herein augments a runtime input data at the inference stage and the augmented data (i.e., message clones) are created to be similar to the training data in one or more factors. For instance, the system may comprise an Email augmentation engine 705 that may expand concise text emails by providing additional context, and contract or condense lengthy emails by removing irrelevant content. In some cases, the clones or augmented emails may be generated to be similar to the training dataset in terms of other factors including, but not limited to, emotions, intents, styles, tones, information, length, or any combination thereof. In some instances, the clone messages may have the same scam type as the original message but vary in one or more of the above factors to be similar to the training data. For example, if the original message is an invoice scam, the training set as well as the one or more clones may have the same urgency, authority, or financial information.

FIG. 4A shows various examples of clones 413 or copies of the original email 411 generated using different augmentation techniques 415. The multiple runtime clones 413 may be created with different styles, vocabulary, and tones, providing the subsequent classification engine (e.g., classification manager 707) with multiple chances to detect potential attacks. In some embodiments, the Email augmentation engine may employ Email augmentation techniques including, but not limited to, expansion, contraction synonyms replacement or any combination of the above. In some cases, the augmentation engine may process the original message such as the original Email 411 to identify the main subject and crucial sentence, facilitating concise and focused communication. In some cases, the augmentation engine may process the original message to summarize the original message by removing irrelevant and off-topic text, generating a more streamlined and effective message. In some cases, the augmentation engine may adjust the writing styles, using synonyms, and modifying vocabulary to enhance clarity and impact.

Figure 4B:
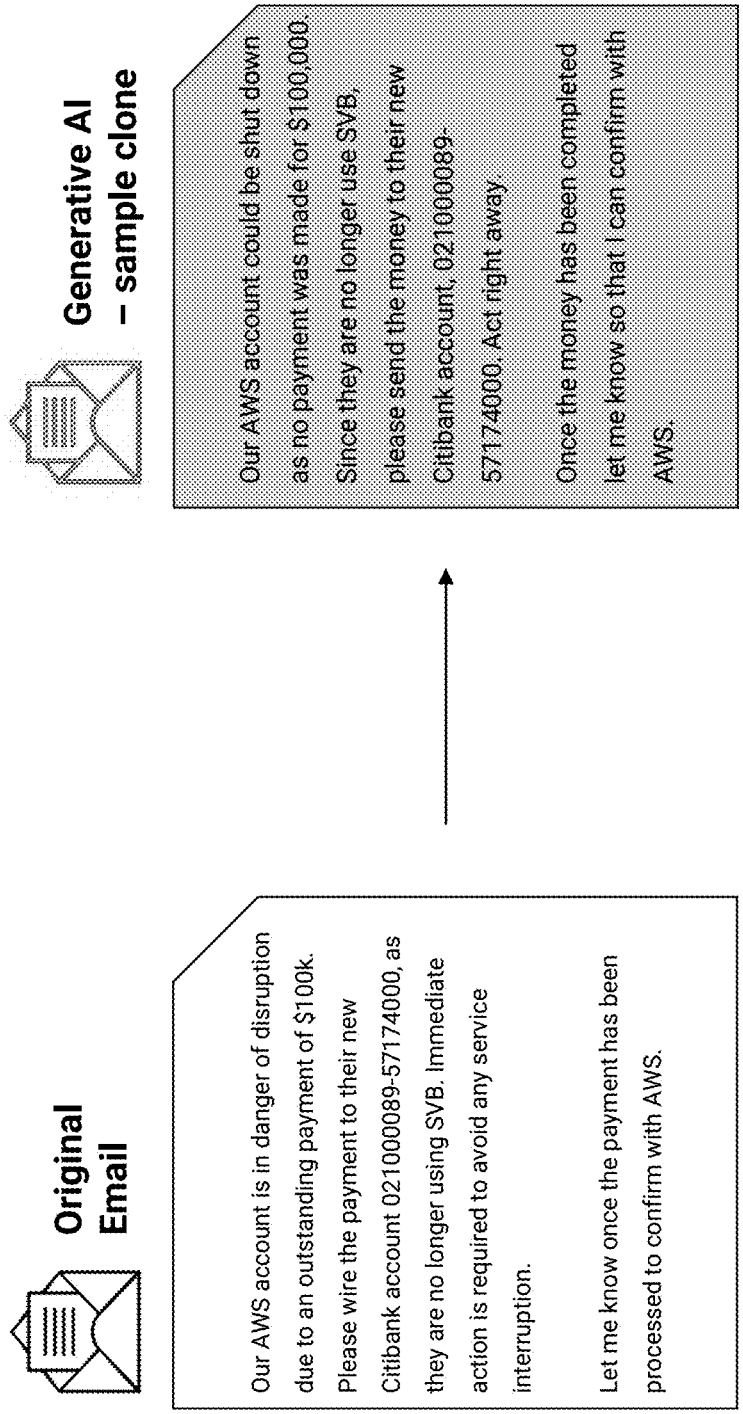

In some embodiments, the multiple runtime clones may be created with styles and/or tones that are different from the original message thereby providing further analysis modules with multiple chances to detect potential attacks. In some embodiments, multiple clones at runtime may be generated and each clone may be varied in one or more of the factors such as length, tone, writing style, format, etc. from the original message. In some cases, a clone copy may be varied from the original message in one or more factors. In some cases, a plurality of clone copies may correspond to variations with respect to one factor. FIG. 4B shows an example of an original message and a clone created with different styles and/or tones. The beneficially allows the BEC attacks that differ significantly from the past attacks or that were excluded from the training data to avoid false positives.

Referring back to FIG. 7, the augmentation engine 705 may employ the diverse augmentation techniques as described above allowing for the generation of a wide variety of email inputs for the classification manager (classification engine) 707, surpassing the limitations of the training data. The runtime augmentation techniques provided herein beneficially provides improved accuracy and coverage in message or email classification. The input data supplied to the classification manager (classification engine) 707 may comprise the multiple clone copies and the original message.

In some embodiments, the Email augmentation engine 705 may comprise a generative AI model to generate the clones or augmented messages. In some embodiments, the generative AI model may be developed by training a pre-trained generative AI model using customized training dataset such that the generative AI model may be capable of discerning the context of BEC and other malicious emails. The generative AI model may be capable of generating clone of an unput message or email by comprehending writing styles, emotions, removing standard email disclaimers, and common warnings, and rephrasing the input emails while preserving their original intent.

In some cases, an objective of training the generative AI engine is to specialize in generating emails, particularly phishing emails. By utilizing customized training dataset to fine-tune a pre-trained model, the generative AI engine is able to produce high-quality emails rather than general-purpose text. In some cases, the method herein may fine-tune a pre-trained foundation model using customized training dataset. For example, the pre-trained model may be based on a Transformer trained on large text corpora but not specifically on extensive email corpus and phishing data. For instance, the Transformer may be BERT, Generative Pre-trained Transformer (GPT) or other large language model (LLM) using masked language modeling as their pre-training tasks. In some embodiments, the pre-trained model may be a Generative Pre-trained Transformer (GPT) which is a general language model trained on uncategorized text data from the internet and other sources. The Transformer model (e.g., GPT) may take transformer model embeddings and generate outputs from them. The pre-training may be performed on a large base of parameters, attention layers, and batch sizes. As an example, a transformer may consist of several encoder blocks and/or decoder blocks. Each encoder block contains a self-attention layer and a feed forward layer, while each decoder block contains an encoder-decoder attention layer in addition to the self-attention and feed forward layers.

In some cases, the fine-tuning process of the pre-trained Transformer model may comprise obtaining focused data, and pre-processing the customized focused data to create customized training dataset. In some cases, the focused data may comprise samples of phishing messages, phishing emails, and benign emails, as well as text extracted from hundreds of millions of phishing pages. During the fine-tuning process, the pre-trained foundation model may be trained using the focused data as described above.

Once the augmented message/emails (clones) are generated, the system may run the classification process on the original message and every clone one by one using the Classification Manager 707. The Classification Manager 707 may employ a generative model, a discriminative model, or a combination of both to process the runtime augmented messages and the original message.

In some cases, the classification manager 707 may process the original message to classify the original message as malicious or benign. As shown in FIG. 8, if the original email is classified 811 as malicious, the system may declare the email as malicious 813, the original email is categorized as malicious. The original email may be blocked 815 and event with threat insights may be generated and reported to the admin console 817.

In some cases, if the original email is classified as benign or not malicious, the method may continue to generate multiple clones for the original email 821, and the multiple clones are processed by the classification manager to classify 823 each clone as malicious or benign. Alternatively, the clones are generated prior to classifying the original email or the clones are generated for the suspicious email identified by the classifier in the first layer rather than the benign email identified by the classicization manager in the second layer. In some cases, upon one or more clones are identified as malicious, the system may declare the original email as malicious 825, and the original email is categorized as malicious. The original email may be blocked 827 and event with threat insights may be generated and reported to the admin console 829.

Referring back to FIG. 7, in some cases, the classified clones and original email may be passed to a BEC detection engine 709 to detect a BEC attack. In some cases, the BEC detection engine 709 may detect a BEC attack based on voting counts. For example, when the classification engine or classification manager classifies even one clone as malicious, the BEC detection engine may identify the original email as malicious. In another example, the BEC detection engine may adjust the voting count in terms of percentages to determine existence of a BEC attack. For instance, the BEC detection engine may not declare or mark the original email as malicious unless at least 50% of the clones are classified as malicious. the BEC detection engine may adjust the voting counts threshold based on the accuracy of the clones classification. For example, the BEC detection engine may adjust the threshold based on evidence of the accidental generation of buggy clones that may incorrectly trigger the classification engine.

In some embodiments, the BEC detection engine 709 may be part of the classification manager 707. The BEC detection engine or the classification manager may comprise a BEC classification engine leveraging a variety of features to make a binary prediction on the status of the input email (original or clone) as "Malicious" or "Not Malicious" (or benign). The input to the BEC classification engine may be the original email or the cloned copy.

In some embodiments, the classifier in the BEC classification engine may be more complex than the classifier in the first layer i.e., contextual classification. As described above, the classifier in the first layer (i.e., contextual classification) may employ a fast-speed model techniques such that the contextual classification engine 703 can operate on every incoming email, with rapid decision-making within milliseconds. An advanced NLP technique like deep learning-based classification at the first stage can considerably slow down the entire processing time, making it impractical for real-time email processing. The contextual analysis stage of the method herein employs a less complicated but faster NLP algorithms sufficiently enough to identify suspicious emails that warrant deeper inspection.

The classifier in the BEC detection stage or the second layer of the system may employ deep learning techniques. The BEC detection engine may classify an input email or a clone as malicious or benign based on a variety of features. The variety of features may be similar to those features extracted in the contextual analysis stage. However, the models for generating the features in the second layer may be different or more advanced than the techniques utilized in the first layer. For example, contextual features utilized in the BEC classification stage may remain consistent with those described in the contextual analysis stage. However, instead of the fast-speed NLP engine utilized for extracting writing style, email tone, and emotion during the contextual classification, the BEC classification may utilize enhanced NLP powered by deep learning which significantly boosts the accuracy of the BEC classification.

In some cases, the features extracted or generated in the BEC classification stage may be different from the features in the contextual analysis stage. For example, a BEC feature generator 713 may be configured to generate a set of features based on the input original email or clones. The set of features may comprise, contextual features as described above (extracted using more deep learning techniques), intent and motive features, financial transactions features and various other features. In some cases, the intent and motive features, financial transactions features and other features extracted by the deep learning model may not be included in the set of features of the first layer.

In some cases, the BEC feature generator 713 may employ deep learning techniques to extract features such as true intent, motives behind emails. The intent and motive features may comprise, for example, Funds Transfer Request, Invoicing, Asking for Assistance, Investment Proposal, Lucrative Opportunity, Loan Offer and the like. FIG. 3 shows examples of BEC features 300 including contextual features (e.g., style 303, tone 302) as well as motive 304, emotion 301 and information 305 extracted utilizing deep learning.

In some cases, the BEC feature generator 713 may employ deep learning techniques to extract transactions features from transactions information. The transaction features may be related to, for example, Wire Transfer Information, Amount Involved, Bank Geo Location, Transaction Type and the like. Features related to Wire Transfer Information may be used to capture important wire transfer-related information. Such features may comprise the origin and destination bank accounts, transaction dates, unique transaction identification numbers, and any accompanying identification numbers. Features related to Amount Involved may focus on how much money is involved in the transaction and may be used by the system to identify amounts that are too big or unusual. Features related to Bank Geo Location may provide geographic location data concerning the involved banks to verify whether the banks' locations align with the typical geographical patterns for legitimate transactions. Features related to Transaction Type may be used to identify the type of transaction, such as wire transfers, online purchases, or ACH payments.

Figure 9:
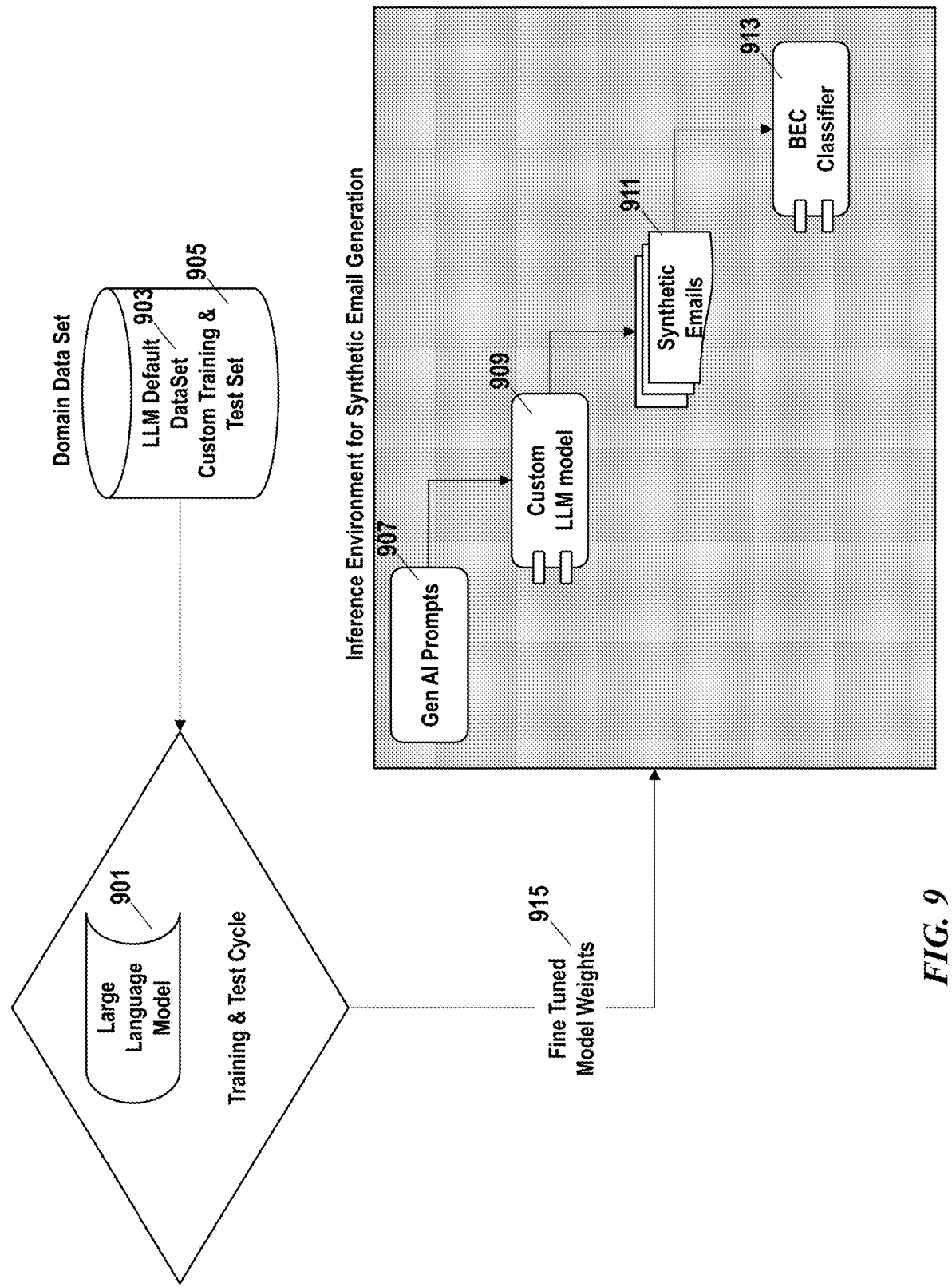
FIG. 9 shows an example of auto-training data generation using a custom LLM model for improving BEC classifier.

The system herein may provide a classification engine for BEC detection with improved performance by generating a large volume of training data with improved quality and quantity. FIG. 9 shows an example of auto-training data generation using a custom LLM model 909 for improving BEC classifier 913. In some cases, the BEC classifier 913 may be developed by leveraging a customized Generative AI engine 909. The customized Generative AI engine may be same as the Generative AI engine for generating the clones. For example, the Generative AI engine may be trained and developed by fine-tuning 915 a pre-trained foundation model (e.g., Large Language Model (LLM)) 901 to be able to produce synthetic benign and malicious emails 911 that closely resemble real-world emails. By utilizing this custom Generative AI engine, the system generates a substantial amount of email training data 911 with accurate labeling, ensuring both quality and quantity while adhering to the fundamentals of email writing.

As described above, the system may fine-tune a pre-trained foundation model using customized training dataset 905. For example, the pre-trained model may be an LLM based on a Transformer trained on large text corpora 903 but not specifically on extensive email corpus and phishing data. For instance, the Transformer may be Generative Pre-trained Transformer (GPT) using masked language modeling as their pre-training tasks. In some embodiments, the pre-trained model may be a Generative Pre-trained Transformer (GPT) which is a general language model trained on uncategorized text data from the internet and other sources. The Transformer model (e.g., GPT) may take transformer model embeddings and generate outputs from them. The pre-training may be performed on a large base of parameters, attention layers, and batch sizes. As an example, a transformer may consist of several encoder blocks and/or decoder blocks. Each encoder block contains a self-attention layer and a feed forward layer, while each decoder block contains an encoder-decoder attention layer in addition to the self-attention and feed forward layers.

Using the Generative AI approach to generate training dataset for the classifier may beneficially fully increase the amount of the training data, thus avoiding the need for regular system retraining. This is in contrast to traditional systems that often require continuous manual training to address False Negatives and False Positives encountered in the production environment. With the custom Generative AI (GAI) engine or LLM 909 generating diverse and relevant examples, the BEC classification engine 913 reduces the necessity for frequent retraining and enhances its overall performance and accuracy.

The methods and systems herein may provide unique prompts template 907 to the custom LLM 909 for creating synthetic emails. The prompts may instruct the custom LLM 909 to generate thousands of emails with varying tones, styles, emotions, and business jargon, and for an Intent such as "Pay an invoice," "Funds transfer," and the like. Following is an example prompt to the GAI for generating training dataset:

Create as many emails as possible in which the sender requests payment through an invoice. AND:

The email was sent by a new acquaintance.

The email is written in an angry and frustrated tone.

The sender is duping the recipient into performing the desired action.

The sender is a well-known individual with a finance background.

Introduce some grammatical errors considering the sender is not a native English speaker.

In some embodiments, the system and method herein may comprise an iterative self-learning loop to continuously improve the classification engine without human intervention. As shown in FIG. 7 and FIG. 8, upon detection of a BEC attack or declaring an original email as malicious 825, one or more of the clones that evaded detection by the classification engines may be identified, and may be further processed by the system to enhance the classification engine and/or the augmentation engine. For instance, the one or more clones that were classified as benign may be identified as undetected clones 716, and such undetected clones may be added to the training data 831 or added to the training data repository 717. Each of the one or more clones that were classified as benign 716 may be processed one by one until all the remaining clones are added to the training data repository. In some cases, when the original email is classified as benign, the detection classification is repeated for each of the clone 835, 837 until all the clones are classified as benign, the original email may be declared as benign 839.

The undetected clones 716 may be inputted into the BEC classification engine or BEC classifier 719 and the LLM 721 (the model for generating synthetic messages) to enhance the model performance.

The system and method herein may provide a self-learning loop for the BEC classifier 719. In some cases, when the classification manager 707 or the BEC classifier 719 fails to classify one or more clones or the original email as malicious during the classification process (e.g., original email is declared as malicious but one or more clones or the original email are classified as benign by the classification engine), these undetected samples may be utilized as false-negative training data. The method and system herein may integrate the undetected samples into the training data through an automated process to improve the classification engine 719. This beneficially exposes the classification engine to real-world variations it has missed during the classifier's initial training. Such infusion of diverse and complex real-world data allows the classification engine to adapt and refine its classification capabilities continuously.

The system and method herein may provide a self-learning loop for the LLM model 721 for generating the clones or the synthetic messages for training the classification engine. In some cases, the same undetected clones 716 may be fed into the LLM model, significantly enhancing its ability to generate training data. By generating additional training data based on these undetected clones, the LLM model continuously supplies the classification engine with examples of potential future attacks, allowing the classification engine 719 to comprehend and identify evolving malicious patterns effectively. Consequently, this strengthens the system's capacity to detect and thwart such threats in the future.

The system and method herein may create a self-learning loop through the iterative process of integrating undetected clones, generating training data, and refining the classification engine and LLM model. The entire system becomes progressively more skilled at recognizing and countering BEC and other related malicious emails. This constant improvement enhances the system's security and accuracy, fortifying it as a robust defense against email-based threats.

Examples and Application of the System and Method

Illustrated herein by FIG. 1 is an example of a run time prediction of a phishing attack implementing the systems and methods as described above. The system may receive a message 101, such as an email or text message. The system may be cloud-based, and may be built into a cloud-based server providing an application (e.g., Microsoft Outlook, Google Workspace) or a product family providing cloud-based services, including the application (e.g., Microsoft 365, Google Workspace). In some embodiments, the application is a web-application or a mobile application. In some instances, the mobile application comprises a social media application, or a messaging and/or calling application. In some instances, the system is integrated into a product family providing cloud-based services, including email.

The message 101 may be processed by a processing module of a security system. The processing module may comprise the tired framework as described in FIGS. 7-9. For example, the first stage may comprise performing filtration 102 on the input message. The filtration may be high speed filtration which is performed by the context classifier or the contextual classification engine as described above. The message 101 identified as suspicious by the filtration may be processed to generate one or more clones 103 of the message utilizing the system and method as described above. The processing module can comprise a generative model that can use the message as an input and generate variations of the message. In some instances, the generative model is trained to determine the relevance of various portions of a message for detection of a phishing attack. In some instances, the processing module is trained to determine the relevance of portions of a message to the context of the message. In some instances, the processing module is trained to determine the relevance of portions of a message to the intent of the message.

In some cases, the expansion or contraction of the message may be the same as runtime augmentation (e.g., email augmentation) as describe elsewhere herein. As described above, contracting a message comprises removing or shortening less relevant or unrelated information to the context or intent of a message. In some instances, expanding a message comprises generating variations or lengthening portions of a message that are relevant to the context or intent of the message. As an example, concise text emails can be expanded by providing additional context, while lengthy emails can be condensed by removing irrelevant or less relevant content.

In contracting and/or expanding the message to rephrase the message, the processing module may create one or more copies of the message (i.e., clones) 103. In some instances, the one or more copies of the message are created to be similar to the training set of the processing module. As described above, similar messages to the training set may comprise the same one or more emotions, intents, styles, tones, information, length, or any combination thereof. In some instances, similar messages have the same scam type. For example, if the original message is an invoice scam, the training set as well as the one or more clones may have the same urgency, authority, or financial information. Multiple runtime clones may be created with different styles and/or tones, thereby providing further analysis modules with multiple chances to detect potential attacks. An exemplary clone is provided in FIG. 4A.

The cloning 103 may be performed in real time by the generative model of the processing module. This runtime cloning may not rely on generative artificial intelligence (AI) prompts, but rather employ generative artificial intelligence (AI) to take the original message as an input to paraphrase it in different styles while keeping the intent of the message intact. By employing runtime cloning, the system may be capable of identifying attacks (e.g., BEC attacks) that were excluded from the training data of the generative model to avoid false positives.

The one or more clones generated by the processing module or the original message may be further analyzed. To identify the most promising clones for each message, various techniques may be employed to narrow or filter the clones. In some examples, the technique comprises input sampling. In some examples, the technique comprises conditional beam search. Once the most promising clones are identified, further analysis may be performed on each of the selected clones and the message.

In some instances, the one or more clones, the original message, or both are analyzed by one or more modules, each comprising a model. In some examples, the model is a discriminative model. In some examples, the model is a classification model. In some examples, the model comprises natural language processing. The classification may be trained on a dataset comprising one or more clones of messages. The security system may comprise one or more classifiers for performing classification on the clones of messages. For example, the classification can be the same as the classification manager and BEC detection engine as described in FIG. 7. In some cases, the classification may comprise employing a BEC feature generator to extract true intent, motives behind the message.

The outputs from the filtration operation 102, the cloning operation 103 and the classification of a BEC attack 104 may comprise a binary verdict 107 and threat insights 108 (for IT consumption). The verdict 107 may indicate whether the original message is benign or malicious. In some instances, the verdict comprises a static output or a dynamic output. In some instances, the verdict comprises a likelihood associated with the verdict. In some instances, the verdict comprises a binary result indicating whether the message is suspicious or benign. In some instances, the verdict may be a binary result indicating whether the message is malicious or non-malicious. In some instances, the verdict may be based on voting counts as described above. For example, the number of clones determined to be malicious from each analysis may be aggregated (e.g., voting count) to determine if a message is malicious.

In some cases, other features in a message may be processed to detect a phishing attack. For instance, links or files attached to a message are also analyzed to detect malicious links or files. For example, if a malicious link or file is detected in a message, the message may be blocked.

The runtime cloning and classification may be performed in real time with high accuracy. In some instances, integration of the security system with a cloud-based services can speed up the detection time. In some examples, the runtime cloning and classification is performed in less than 5 minutes, 4 minutes, 3 minutes, 2 minutes, 1 minute, 45 seconds, 30 second, 15 seconds, 10 seconds, 5 second, 2 seconds, or 1 second. In some examples, the detection rate of attacks is at least 80%, 85%, 90%, 95%, 96%, 97%, 98%, 98.5%, 99%, 99.5%, 99.6%, 99.7%, 99.8%, 99.9%, 99.95%, or 99.99%.

The models in the security system provided herein may be trained on copies of messages. In some examples, the generative model is used to generate as many messages as possible (training data) using the filtration and cloning described herein. A method of training the system may generally comprise collecting input data, which may be one or more prompts (e.g., generative artificial intelligence (GAI) prompts), one or more messages, or both. In some examples, the one or more messages are benign messages, malicious messages, or both. The input data may be used by the generative model to generate a training set with messages similar to an original one or more messages for training of downstream models (e.g., classification engines for intent or context analysis). In some instances, the system generates hundreds, thousands, tens of thousands, or hundreds of thousands of messages with varying tones, styles, emotions, business jargon, or any combination thereof for an intent (e.g., "pay an invoice" or "funds transfer").

As an example, a GAI prompt can comprise: "Create as many emails as possible in which the sender requests payment through an invoice. AND: The email was sent by a new acquaintance. The email is written in an angry and frustrated tone. The sender is duping the recipient into performing the desired action. The sender is a well-known individual with a finance background. Introduce some grammatical errors considering the sender is not a native English speaker."

In some instances, the generative model is trained to generate training data comprising copies of a message. In some cases, a generative model may comprise existing pre-trained large language models with billions, tens of billions, hundreds of billions, or trillions of parameters. As an example, if the generative model has no more than 1 billion 10 billion, 50 billion or 100 billion parameters, the generative model may be retrained to generate new weights. In such examples, the model may be trained with prompts for autoregressive learning or one or more examples of messages that are benign and/or malicious. The model, in some cases, may further be trained to learn an instruct Q&A structure such that prompts (e.g., GAI prompts or exemplary email) can be used to generate the training set. However, if the generative model has 100 billion, 500 billion, or 1 trillion or more parameters, the generative model may not need to be retrained.

The clones generated by the generative model can be used as training data for discriminative models. However, in some examples, for very short messages or those containing excessively unrelated words, the generated clones are overly specific or generic, leading to false positives and false negatives. To mitigate this occurrence, problematic clones are eliminated during the training phase, which introduces the possibility of false negatives. In some examples, about 0.1%, 0.5%, 1%, 2%, 5%, or 10% of clones are eliminated. Therefore, in some examples, further runtime cloning can be introduced, as discussed herein, as an additional measure to detect phishing attacks.

While the generative model may exhaust the training data to avoid frequent retraining, in some cases, further training may be used improve the system's ability of detect attacks.

In some instances, retraining the generative model comprises unsupervised training on inaccurately classified emails so that the generative model becomes more familiar with updated emails styles or tones, or any other feature described herein. The generative model may then be prompted to generate an updated training data in bulk, taking into account recent trends in phishing attacks. The classification engines module may be further trained on this updated training set.

Figure 2:
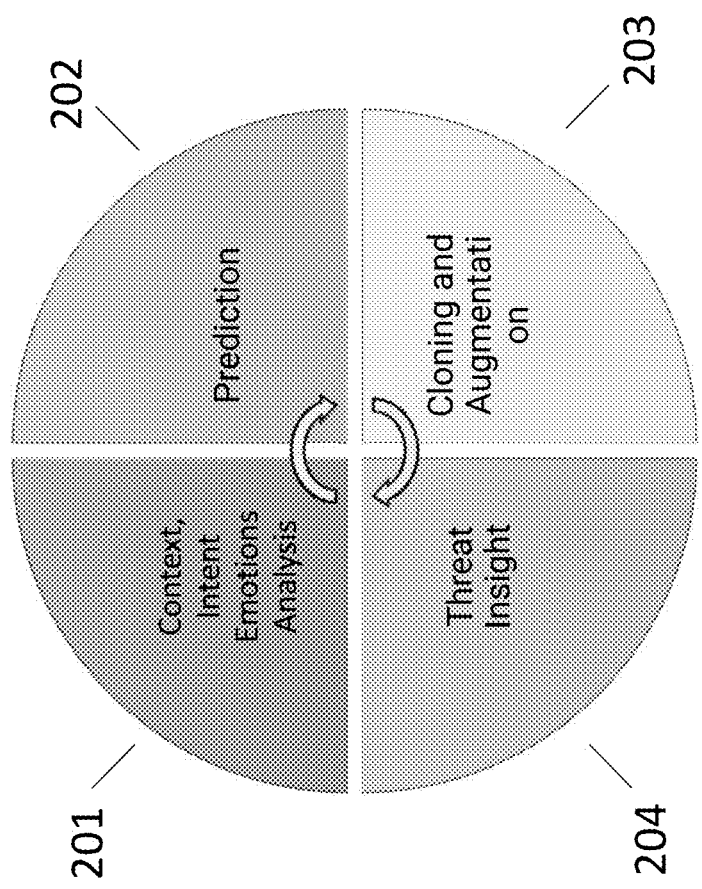
FIG. 2 shows an example system employing the methods herein for detecting and reporting a phishing attack in accordance with the embodiments of the invention.

The systems and methods provided herein may continuously learn to improve its ability to detect phishing attacks. By extracting topics, intent, emotions, styles, or any other features of a malicious message (e.g., emails), rich data is obtained for further training of the models and further improved runtime predictions. For example, classification module described herein can continuously learn from each other's outputs. An exemplary schematic of this feedback is provided in FIG. 2. As shown, the system may perform Context, Intent, Emotions Analysis 201 on a message using natural language processing, for example, using classifiers built on deep learning for emotion, intent, or style, as described herein. The Context, Intent, Emotions Analysis 201 may be used to generate a prediction 202 (e.g., classification of whether the message is malicious). In some examples, the prediction 202 is used for future message variances (e.g., future BEC variances) for run-time execution, training, or both. In some instances, this prediction 202 may be used as a part of the cloning and augmentation 203 in the contextual analysis performed by the system. The one or more contexts of message may be determined by analyzing the relationship in a message (e.g., sender-recipient relation in an email). In some examples, the relationship is analyzed using a custom graph database. The output of cloning and augmentation 203 may be used to generate threat insights 204, such as those discussed herein. These threat insights 204 in turn can provide further information for future Context, Intent, Emotions Analysis 201 to improve the prediction 202 by the classification module. The system can be in electronic communication with a user such as a third party through an API, as discussed herein, which can provide input to the system (e.g., messages) and receive outputs from the intent analysis module and the context analysis module (e.g., verdict).

Figure 5:
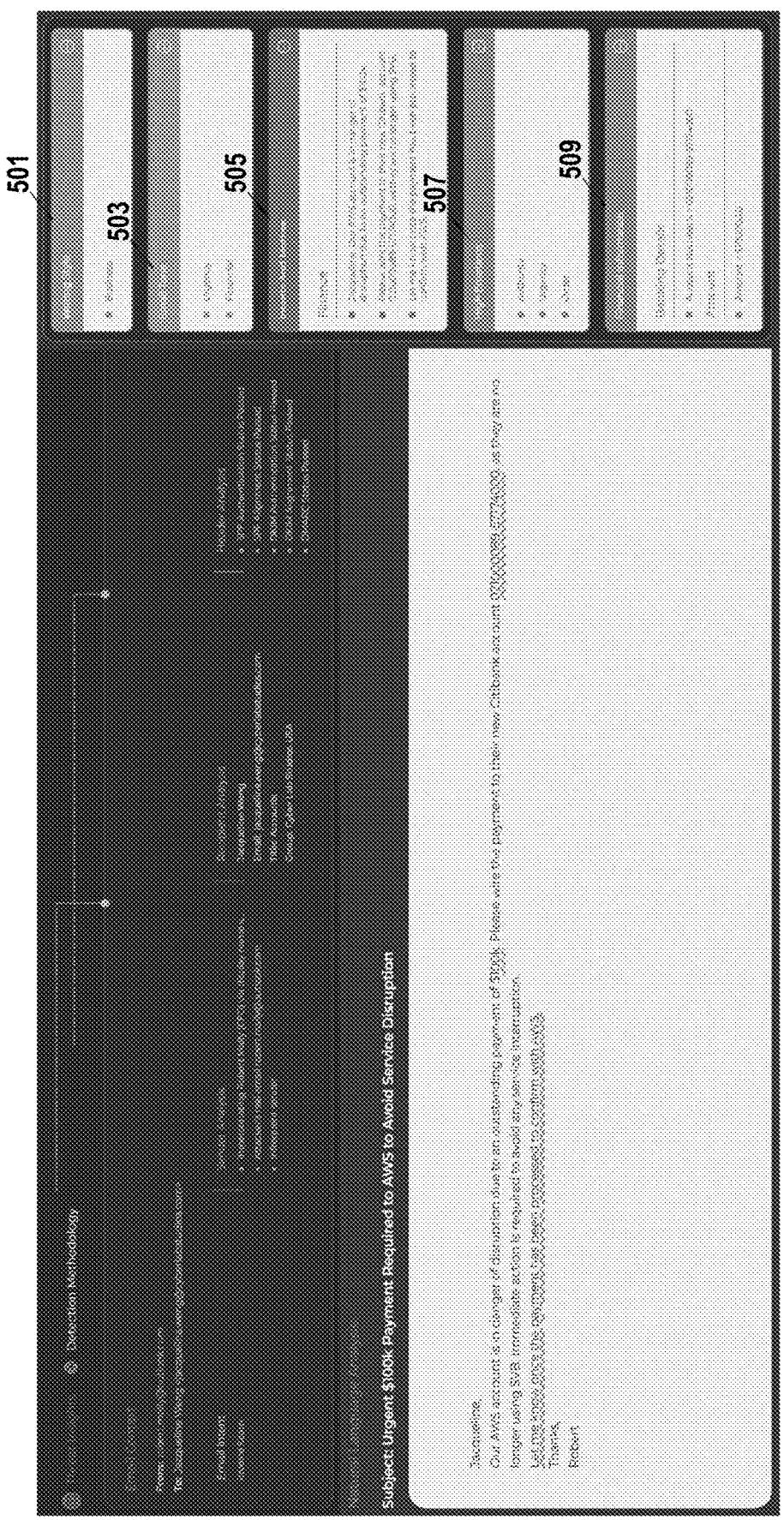
FIG. 5 shows an example of a graphical user interface (GUI) displaying threat insights of an email in accordance with the embodiments of the invention.

In some instances, a malicious message is blocked or filtered out from a user's inbox such that the user never sees the message. In some instances, a user is notified of a malicious message. In some examples, threat insights from a malicious message (BEC email) are provided to a user (e.g., recipient or admin of an organization). In some cases, threat insights may be provided to a user on a GUI. An exemplary GUI displaying threat insights 501, 503, 505, 507, 509 from an email is provided in FIG. 5. The GUI may display the threat insights. The threat insights may comprise summaries of (intermediary) outputs from the first layer (e.g., contextual analysis) or the second layer analysis (e.g., BEC detection). For example, contextual features and/or BEC features such as the intent and motives 505 (e.g., type of scam), sender background/relationship, writing style 501, email tone 503, high emotions 507, and financial information 509 may be displayed as threat insight. The threat insights may comprise any information extracted by the processing modules of the system, including but not limited to, sender address and recipient address, the classification of the email as a particular type of scam (e.g., an invoice scam), who the attacker is impersonating (e.g., a link to the person's social media), their real address, and that they are an infrequent sender, and a recipient analysis detailing the recipient, their email address, title, and group (or organization) and social media profiles. For example, within a GUI, a victim's social media profile may be displayed so that uses can learn easily who is being victimized.

In some cases, the threat insight may comprise classification outputs, for example, the classification of the writing style as business or the email tone as urgent and financial, texts of portions of the email directed to intents/motives or the relevant financial information extracted from the text.

In some instances, a GUI may highlight portions of the text in different colors or shades of colors corresponding to the respective threat insights. For example, referring to FIG. 6A, the phrase "I have an urgent task for you" may be highlighted or underlined in purple, and the email tone box from the intent analysis with the classification output of "urgent" is also purple. Further, the phrase "I am very frustrated to hear that they WILL stop the shipment if we didn't pay the invoice on time!" or "Unfortunately, I can't take calls right now, so reply to this email if you have any questions" may be highlighted or underlined in orange, and the corresponding high emotions box from the intent analysis with the classification outputs of "anxiety" and "sad" are also orange. The phrases corresponding to intents and motives in the email may be highlighted in the same color as the intents and motives box, as well as the financial information in the email being the same color as the financial information box. Referring to FIG. 6B, the user may be switch between different portions of the intent analysis, for example, by only highlighting or underlining sections of the email corresponding to the intents and motives. Further, a user may be able to expand or minimize one or more portions of the context analysis or intent analysis, as shown for example in FIG. 6C. One or more of the features provided herein can allow users to easily understand through visual illustrations the reasoning why a message (e.g., an email) may have been classified as malicious.

Further, a user may visualize copies of emails (or clones) that were generated by the generative model, as well as an aggregate verdict. As shown in the example of a GUI in FIG. 6D, a GUI may display the number of malicious clones detected from a total number of clones. In some examples, the GUI may further comprise a verdict from based on the number of malicious emails, percent of malicious emails, or both. Referring to FIG. 6D, the GUI may further display the message along with one or more top clones. The top clones may be, in some instances, clones that were determined to be malicious or clones that are representative of the sample space of clones generated by the generative model. The clones may be expanded, as shown in FIG. 6E, for a user to further visualize the variations in messages generated by the system.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. In some cases, cloud computing is provided by a cloud computing service provider, which may include, by way of non-limiting examples, Microsoft Azure, Amazon Web Services, Google Compute Engine, and Alibaba Cloud. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or extensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of digital media, advertising, and game information. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example 1—BEC Phishing Detection

A security system as shown in FIG. 1 is integrated into a product family providing cloud-based services, including email. The security system is configured to analyze an email 101 received by a user of an organization in less than 5 minutes.

The security system employs a processing module with a generative model trained to detect malicious emails, or more specifically, business email compromises. The system uses filtration 102 to detect suspicious emails through high speed NLP algorithms. The generative model performs cloning 103 to generate a plurality of clones of the original email as described above. The generative model generates multiple copies, or clones 103, of the email in real time. The multiple copies are similar to those used in a training data of the model.

The original email, as well as some or all of the clones are then analyzed by a classification module 104. The classification module 104 analyzes the writing style, tone, intents, emotions, and financial information to classify the original message, or the one or more clones as malicious or not. The classification module 104 also analyzes the intent, sender, recipient and sender relationship, as well as the header to classify the original message, or the one or more clones as malicious or not. In some instances, the outputs from the classification analysis are aggregated to product a verdict 107 (e.g., voting count). In alternative instances, if the classification analysis determines an email is malicious, the verdict 107 is that the email is malicious. Additionally, threat insights 108 may be generated and reported to the admin console 817.

Example 2—GUI for BEC Phishing Detection

The security system as generally described in Example 1 is used by an organization to filter out incoming malicious emails to its employees. The security system also provides a summary of outputs related to malicious email to an administrator of the organization for visualization of the reasoning why a message (e.g., an email) may have been classified as malicious.

Figure 6A:
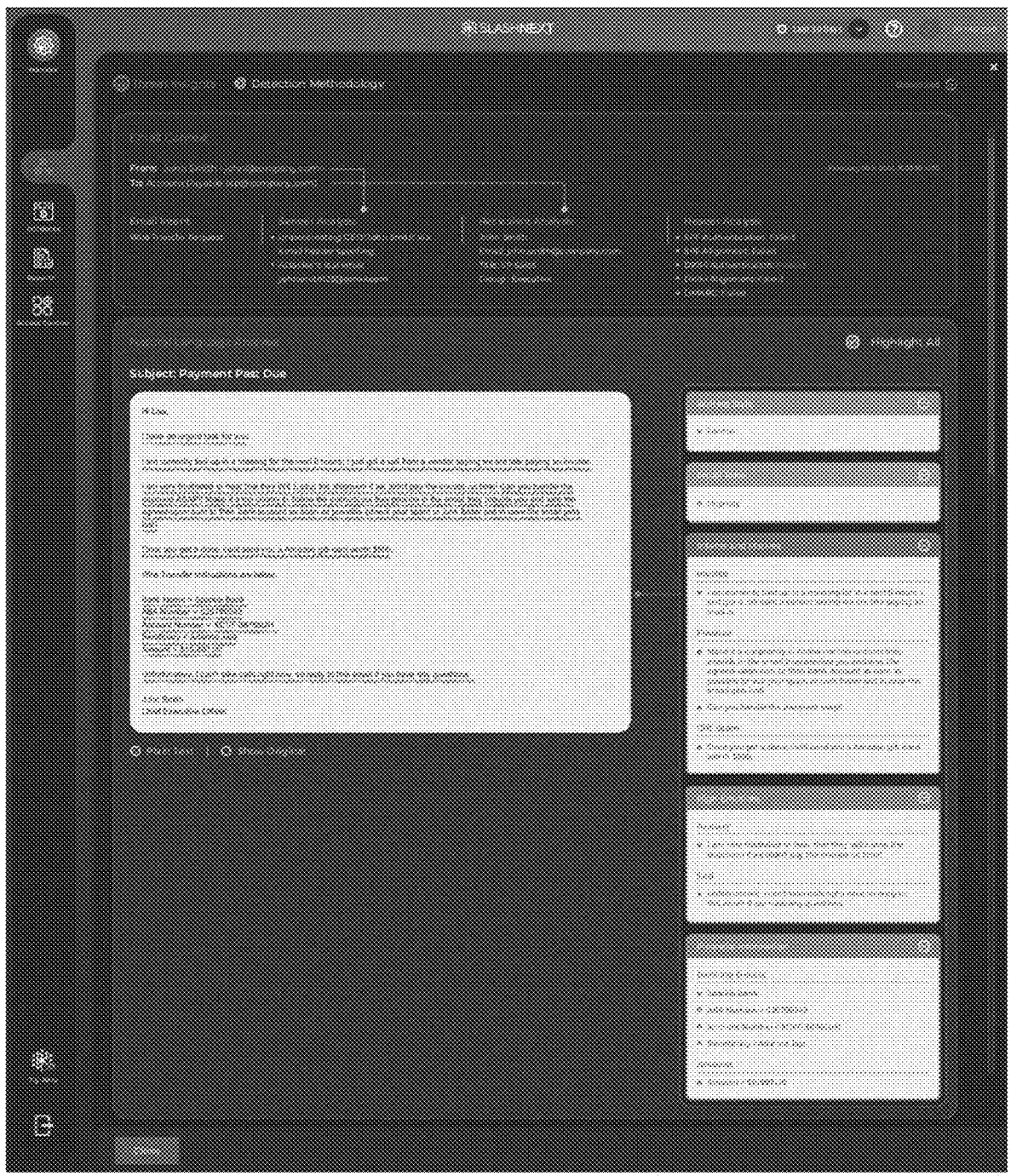
FIGS. 6A-6B show examples of a GUI displaying threat insights by highlighting sections of an email by color that correspond to the respective intent insights in accordance with the embodiments of the invention.
Figure 6B:
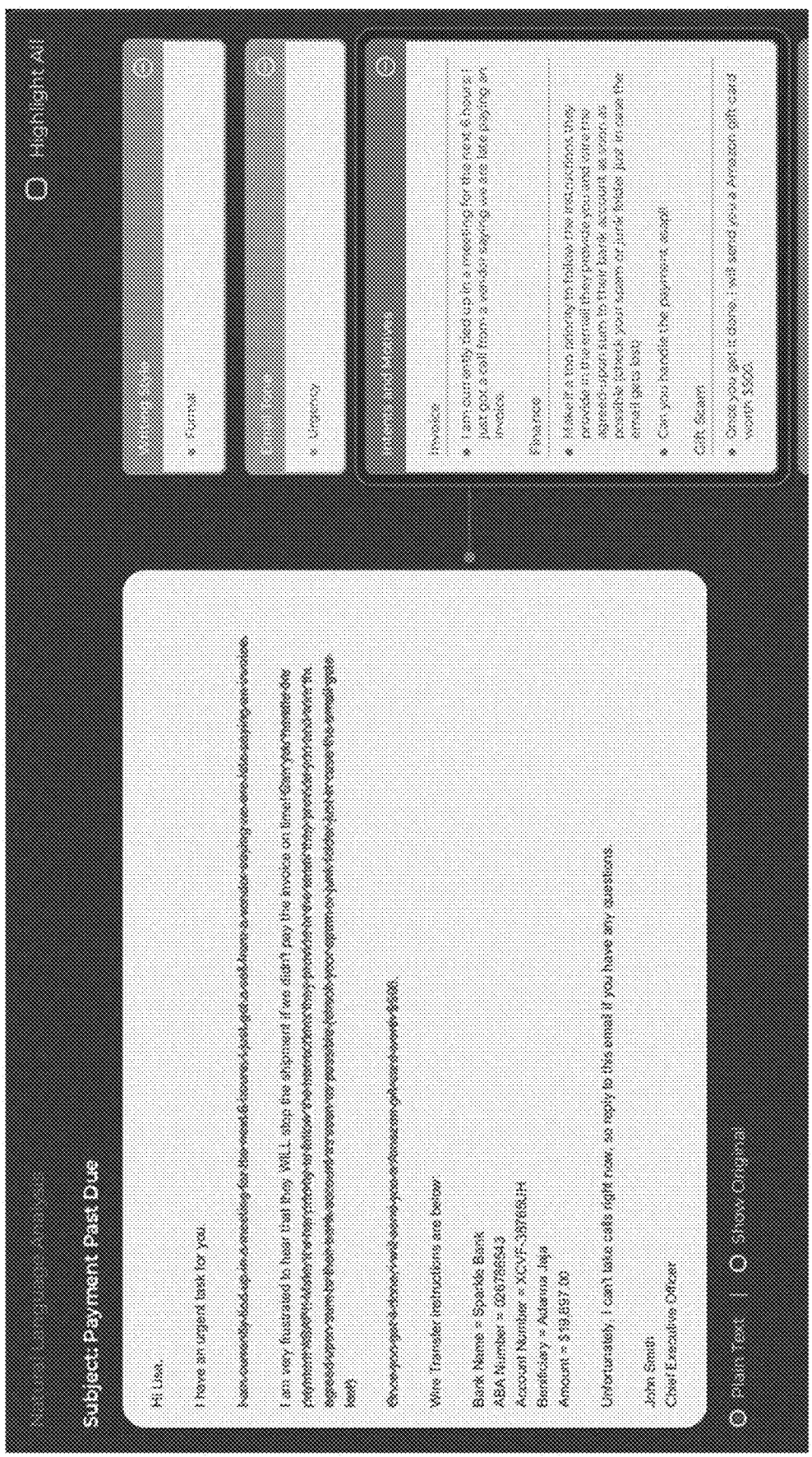
Figure 6C:
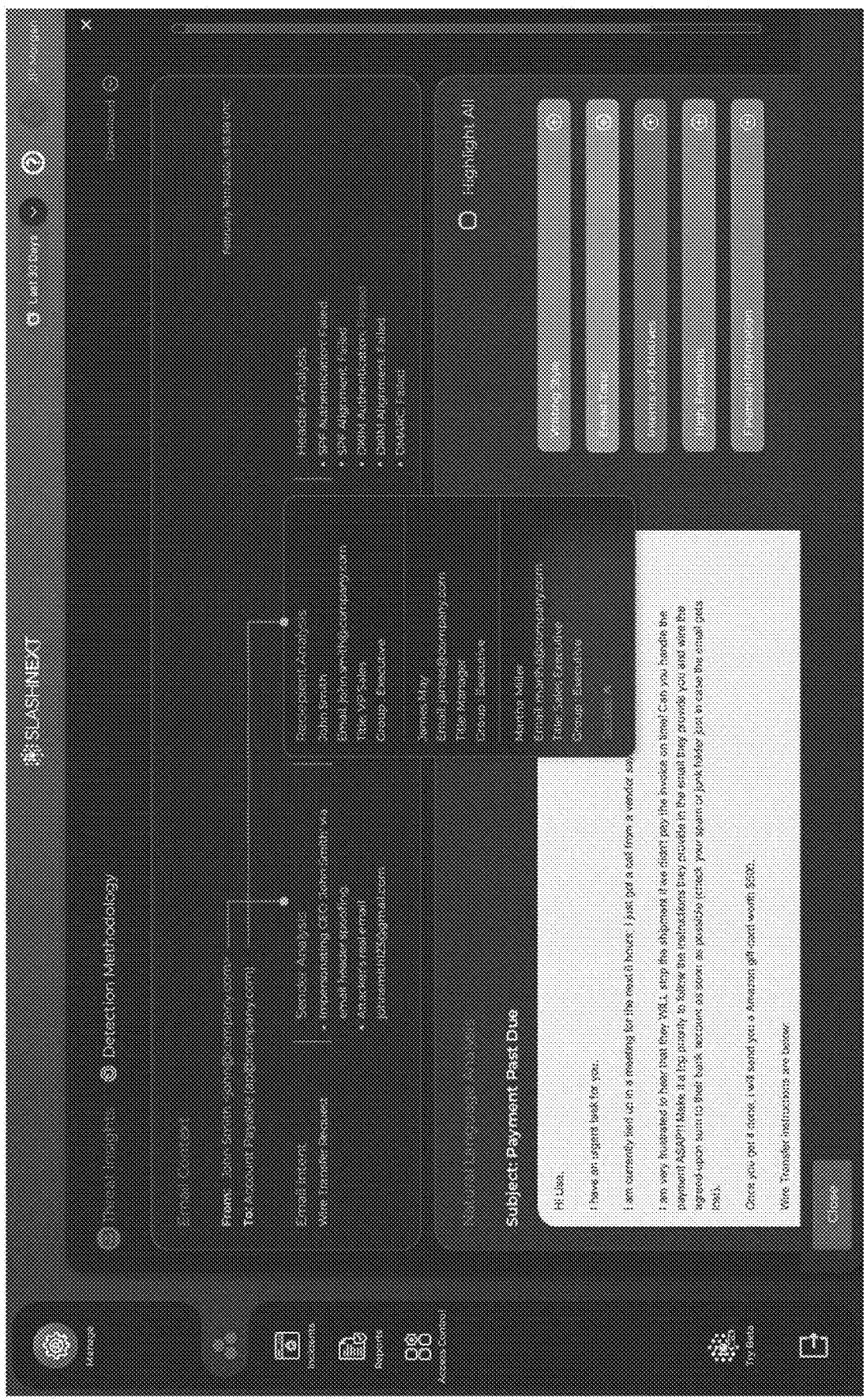
FIG. 6C shows an example of a GUI with expanded context insights in accordance with the embodiments of the invention.
Figure 6D:
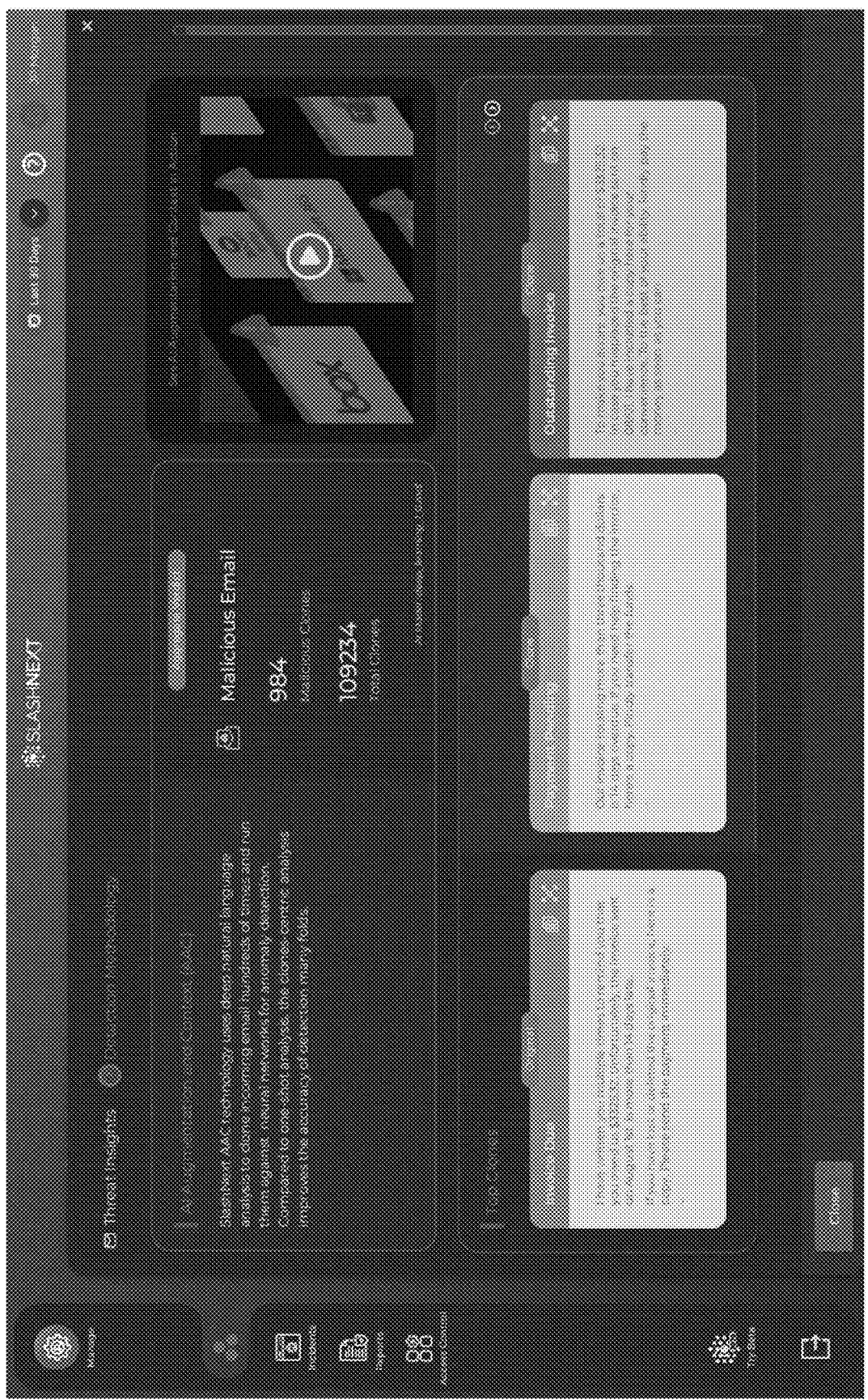
FIG. 6D an example of a GUI displaying the augmentation and context of email, including an aggregate verdict and top clones generated from an email, in accordance with the embodiments of the invention.
Figure 6E:
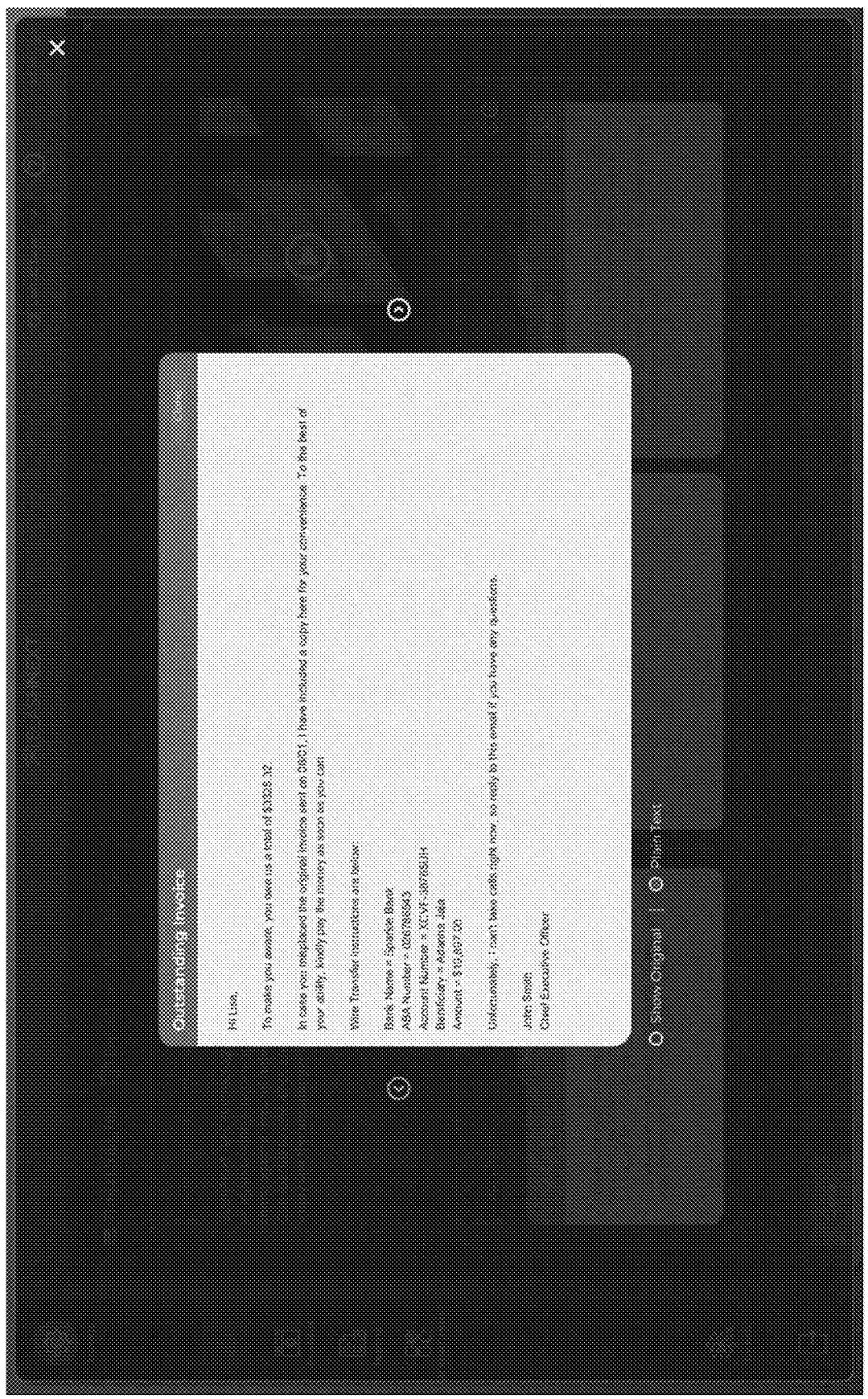
FIG. 6E an example of a GUI displaying a generated clone in accordance with the embodiments of the invention.

The GUI displayed to the administrator is shown in FIG. 6A. As shown, the administrator can visualize outputs from the context analysis, intent analysis, as well as the original email. Portions of the email are highlighted, corresponding to classification outputs from the intent analysis (right boxes corresponding to writing style, email tone, intents and motives high emotions, and financial information). The administrator can select one or more of the outputs from the intent analysis, as shown in FIG. 6B to better understand each category from the classification output. The administrator can further expand or minimize portions from the classification outputs from the intent or context analysis, as shown in FIG. 6C.

The administrator can further review a summary page (e.g., FIG. 6D) with an aggregate verdict, the number of copies (or clones) of the email classified as malicious, and the total copies generated by the system. The top clones that are most representative of the sample space generated by the generative model are also displayed, which can further be expanded or minimize, as shown in FIG. 6E.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A method for phishing detection for emails, the method comprising:
   (a) processing an original message to determine whether the original message is suspicious;
   (b) upon determining the original message is suspicious, generating multiple copies of the original message for detecting a phishing attack, wherein the multiple copies are varied from the original message in least one of lengths, tones, formats, and writing styles such that the multiple copies are generated to be similar to a training dataset that is utilized to train a phishing attack detection engine;

(c) processing the multiple copies and the original message by the phishing attack detection engine to detect an attack; and (d) upon detecting the phishing attack, alerting a user about the phishing attack, filtering or blocking the original message.

2. The method of claim 1, wherein (a) comprises extracting a set of features from the original message utilizing a fast speed natural language processing technique.

3. The method of claim 2, wherein the set of features comprise at least one of a header feature, a content feature, a sender background feature, and a sender relationship.

4. The method of claim 3, further comprising processing the set of features by a classifier to determine whether the original message is suspicious.

5. The method of claim 1, wherein the multiple copies are generated utilizing a large language model.

6. The method of claim 1, wherein (c) comprises extracting a set of features from the multiple copies and the original message utilizing a deep learning model.

7. The method of claim 6, wherein the set of features comprise at least an intent and motive feature extracted utilizing the deep learning model.

8. The method of claim 1, wherein the multiple copies and the original message are processed by the phishing attack detection engine to classify the original message and each copy as malicious or benign.

9. The method of claim 8, further comprising when the original message is classified as malicious at (c), storing one or more copies from the multiple copies that are not classified as malicious as training data.

10. The method of claim 9, further comprising training the phishing attack detection engine using the one or more copies from the multiple copies to improve the phishing attack detection engine.

11. The method of claim 8, further comprising aggregating a classification for each of the multiple copies and the original message to detect the attack.

12. The method of claim 11, wherein the attack is detected when a voting count of the classification is above a threshold.

13. The method of claim 1, further comprising receiving the original message in an image and extracting the original message from the image utilizing Optical Character Recognition prior to (a).

14. A system comprising:
(i) a memory for storing a set of software instructions,
(ii) one or more processors configured to execute the set of software instructions to perform operations comprising:

(a) processing an original message to determine whether the original message is suspicious, (b) upon determining the original message is suspicious, generating multiple copies of the original message for detecting a phishing attack, wherein the multiple copies are varied from the original message in least one of lengths, tones, formats, and writing styles such that the multiple copies are generated to be similar to a training dataset that is utilized to train a phishing attack detection engine, (c) processing the multiple copies and the original message by the phishing attack detection engine to detect an attack, and (d) upon detecting the phishing attack, alerting a user about the phishing attack, filtering or blocking the original message.

15. The system of claim 14, wherein (a) comprises extracting a set of features from the original message utilizing a fast speed natural language processing technique.

16. The system of claim 15, wherein the set of features comprise at least one of a header feature, a content feature, a sender background feature, and a sender relationship.

17. The system of claim 16, wherein the set of features are processed by a classifier to determine whether the original message is suspicious.

18. The system of claim 17, wherein the multiple copies are generated utilizing a large language model.

19. The system of claim 14, wherein (c) comprises extracting a set of features from the multiple copies and the original message utilizing a deep learning model.

20. The system of claim 19, wherein the set of features comprise at least an intent and motive feature extracted utilizing the deep learning model.

21. The system of claim 14, wherein the multiple copies and the original message are processed by the phishing attack detection engine to classify the original message and each copy as malicious or benign.

22. The system of claim 21, wherein when the original message is classified as malicious at (c), storing one or more copies from the multiple copies that are not classified as malicious as training data.

23. The system of claim 22, wherein the phishing attack detection engine is further trained using the one or more copies from the multiple copies to improve the phishing attack detection engine.

24. The system of claim 21, wherein the operations further comprise aggregating a classification for each of the multiple copies and the original message to detect the attack.

25. The system of claim 24, wherein the attack is detected when a voting count of the classification is above a threshold.

26. The system of claim 14, wherein the original message is received from a sender in an image format and the original message is extracted from the image format utilizing Optical Character Recognition.

* * * * *